(12) United States Patent
Kamae et al.

(10) Patent No.: US 10,538,637 B2
(45) Date of Patent: Jan. 21, 2020

(54) EPOXY RESIN COMPOSITION, FIBER-REINFORCED COMPOSITE MATERIAL, AND METHOD FOR PRODUCING THE SAME

(71) Applicants: Toshiya Kamae, Ehime (JP); Shinji Kochi, Ehime (JP); Masayuki Miyoshi, Ehime (JP); Kenichi Yoshioka, Ehime (JP)

(72) Inventors: Toshiya Kamae, Ehime (JP); Shinji Kochi, Ehime (JP); Masayuki Miyoshi, Ehime (JP); Kenichi Yoshioka, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 607 days.

(21) Appl. No.: 15/017,575

(22) Filed: Feb. 5, 2016

(65) Prior Publication Data
US 2016/0159993 A1    Jun. 9, 2016

Related U.S. Application Data

(62) Division of application No. 12/934,614, filed as application No. PCT/JP2009/055573 on Mar. 23, 2009.

(30) Foreign Application Priority Data

Mar. 25, 2008 (JP) ................. 2008-077721
Oct. 3, 2008 (JP) ................. 2008-258102

(51) Int. Cl.
    *B29C 70/06*     (2006.01)
    *C08J 5/04*     (2006.01)
    (Continued)

(52) U.S. Cl.
    CPC .............. *C08J 5/047* (2013.01); *B29C 70/06* (2013.01); *B29C 70/443* (2013.01); *B29C 71/02* (2013.01);
    (Continued)

(58) Field of Classification Search
    CPC .................. C08J 5/047; B29C 70/06
    See application file for complete search history.

(56) References Cited

U.S. PATENT DOCUMENTS 2,853,467 A    9/1958   Bloom et al.
4,521,583 A *   6/1985   Kohli .................... C08G 59/56
                                               525/523
(Continued)

FOREIGN PATENT DOCUMENTS

JP    S61-29613 B2    7/1986
JP    S62-34251 B2    7/1987
(Continued)

OTHER PUBLICATIONS

International Search Report in related application PCT/JP2009/055573 dated Jun. 16, 2009.
(Continued)

*Primary Examiner* — Austin Murata
(74) *Attorney, Agent, or Firm* — Pillsbury Winthrop Shaw Pittman LLP

(57) ABSTRACT

Disclosed herein are an epoxy resin composition for fiber-reinforced composite materials which has low viscosity, high Tg, high elastic modulus, and excellent fracture toughness and a fiber-reinforced composite material using such an epoxy resin composition which has excellent thermal properties, compressive strength, impact resistance, fatigue resistance, and open-hole tensile strength and which is suitable for producing structural parts of aircraft and the like. The epoxy resin composition comprises at least a given bifunctional epoxy resin as a component (A), a liquid aromatic diamine curing agent as a component (B), and core-shell polymer particles as a component (C), wherein the core-shell polymer particles as the component (C) contain epoxy groups in their shell and have a volume-average particle size of 50 to 300 nm.

15 Claims, 1 Drawing Sheet

(51) Int. Cl.
*C08G 59/50* (2006.01)
*C08G 59/32* (2006.01)
*C08L 63/00* (2006.01)
*C08J 3/20* (2006.01)
*C08G 59/38* (2006.01)
*B29C 70/44* (2006.01)
*B29C 71/02* (2006.01)
*C08K 7/02* (2006.01)
*B29K 63/00* (2006.01)
*B29K 307/04* (2006.01)

(52) U.S. Cl.
CPC ......... *C08G 59/3209* (2013.01); *C08G 59/38* (2013.01); *C08G 59/5033* (2013.01); *C08J 3/20* (2013.01); *C08J 5/04* (2013.01); *C08L 63/00* (2013.01); *B29K 2063/00* (2013.01); *B29K 2307/04* (2013.01); *C08J 2363/00* (2013.01); *C08J 2463/02* (2013.01); *C08J 2477/06* (2013.01); *C08K 7/02* (2013.01); *Y10T 428/249922* (2015.04)

(56) References Cited

U.S. PATENT DOCUMENTS

| | | | |
|---|---|---|---|
| 4,540,750 A * | 9/1985 | Ham | C07D 303/24 525/504 |
| 4,645,803 A * | 2/1987 | Kohli | C08G 59/50 523/435 |
| 5,290,857 A | 3/1994 | Ashida et al. | |
| 5,396,932 A * | 3/1995 | Homma | D03D 15/00 139/420 A |
| 5,534,594 A | 7/1996 | Troy et al. | |
| 6,277,905 B1 | 8/2001 | Keep | |
| 2004/0044147 A1* | 3/2004 | Kamae | C08G 59/18 525/523 |
| 2004/0242836 A1* | 12/2004 | Hayes | C08G 59/5033 528/124 |
| 2004/0247882 A1 | 12/2004 | Kouchi et al. | |
| 2007/0148442 A1 | 6/2007 | Shibayama et al. | |
| 2008/0188609 A1* | 8/2008 | Agarwal | C08L 51/04 524/504 |
| 2010/0108259 A1* | 5/2010 | Aspin | C09J 5/06 156/330 |

FOREIGN PATENT DOCUMENTS

| | | |
|---|---|---|
| JP | S5-65391 A | 3/1993 |
| JP | H7-224144 A | 8/1995 |
| JP | 2955145 B2 | 7/1999 |
| JP | 2003-277471 A | 10/2003 |
| JP | 2003-277579 | 10/2003 |
| JP | 2004-315572 | 11/2004 |
| JP | 2005-248109 A | 9/2005 |
| JP | 2005-262818 A | 9/2005 |
| JP | 2005-527410 A | 9/2005 |
| JP | 2006-257391 A | 9/2006 |
| WO | 2003-040206 A1 | 5/2003 |
| WO | 03/101708 A1 | 12/2003 |

OTHER PUBLICATIONS

Extended European Search Report dated Jan. 4, 2016 in corresponding European Application No. 09725817.2 (5 pages).

* cited by examiner

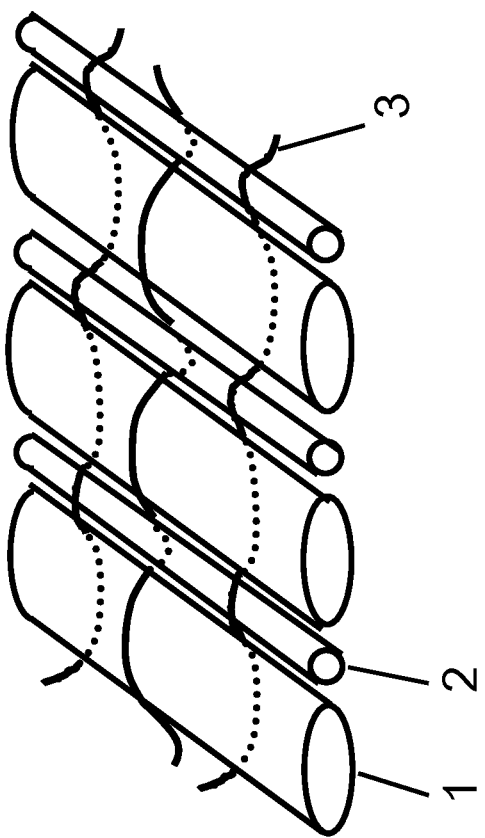

EPOXY RESIN COMPOSITION, FIBER-REINFORCED COMPOSITE MATERIAL, AND METHOD FOR PRODUCING THE SAME

CROSS REFERENCE TO RELATED APPLICATIONS

This present application is a divisional of U.S. patent application Ser. No. 12/934,614, filed Jan. 10, 2011, which is a U.S. National phase of International Application No. PCT/JP2009/055573, filed Mar. 23, 2009, which in turn claims priority to Japanese Patent Application No. 2008-077721, filed on Mar. 25, 2008 and Japanese Patent Application No. 2008-258102, filed on Oct. 3, 2008. The contents of each of which are incorporated herein by reference in their entirety.

FIELD OF THE INVENTION

The present invention relates to an epoxy resin composition for use as a matrix resin of fiber-reinforced composite materials suitable for producing structural parts of aircraft, spacecraft, vehicles, ships, and the like. More specifically, the present invention relates to an epoxy resin composition having low viscosity, high glass transition temperature (hereinafter, glass transition temperature is sometimes abbreviated as "Tg"), high elastic modulus, and excellent fracture toughness. Further, the present invention relates to a fiber-reinforced composite material produced using such an epoxy resin composition and a method for producing such a fiber-reinforced composite material.

BACKGROUND ART

Fiber-reinforced composite materials composed of reinforcing fibers such as glass fibers, carbon fibers, and aramid fibers and cured products of thermosetting resins such as unsaturated polyester resins, vinyl ester resins, epoxy resins, phenol resins, cyanate ester resins, and bismaleimide resins are lightweight and have excellent mechanical properties such as strength and elastic modulus, and are therefore used in various fields such as aircraft structural parts, spacecraft structural parts, vehicle structural parts, ship structural parts, civil engineering and construction materials, and sporting goods. Particularly, fiber-reinforced composite materials using continuous fibers are used for applications requiring high performance. In this case, carbon fibers excellent in specific strength and specific elastic modulus are often used as reinforcing fibers and epoxy resins excellent in adhesion to carbon fibers are often used as matrix resins.

However, epoxy resin cured products obtained by curing epoxy resin compositions are generally brittle, and therefore an improvement in the toughness of epoxy resin cured products is an important issue in improving the impact resistance and fatigue resistance of fiber-reinforced composite materials. In addition, it is also necessary to suppress crack propagation from holes to improve the open-hole tensile strength of fiber-reinforced composite materials. Also from such a viewpoint, an improvement in the toughness of epoxy resin cured products is an important issue.

It is known that the toughness of a cured product of an epoxy resin composition can be improved by adding rubber or a thermoplastic polymer to the epoxy resin composition. As a method for adding rubber, a method using rubber such as carboxyl-terminated butadiene-acrylonitrile copolymer (CTBN) rubber or nitrile rubber has been proposed (see, for example, Patent Documents 1 and 2).

According to this method, rubber is once dissolved in an epoxy resin composition, but thereafter phase separation occurs during curing process. This causes a problem that a desired toughness-improving effect cannot be obtained due to a change in the morphology of a cured product depending on the kind of epoxy resin composition used or curing conditions. In addition, a rubber component is partially dissolved in an epoxy resin phase of an epoxy resin cured product, which causes a problem that the viscosity of the epoxy resin composition is increased and the Tg and elastic modulus of the epoxy resin cured product are lowered.

In order to solve such problems, various methods using polymer particles substantially insoluble in epoxy resins have been proposed. For example, a method using core-shell polymer particles formed by partially or fully coating the surface of particles as a core mainly made of a polymer with a polymer different from the polymer constituting the core by, for example, graft polymerization has been proposed (see, for example, Patent Documents 3 to 6). It is known that such a method makes it possible to suppress an increase in the viscosity of an epoxy resin composition and a lowering of the Tg of an epoxy resin cured product.

However, in order to obtain a sufficient toughness-improving effect, it is necessary to add a large amount of core-shell polymer particles. Therefore, there is a remaining problem that addition of a large amount of core-shell polymer particles lowers the elastic modulus of an epoxy resin cured product, thereby lowering the compressive strength of a fiber-reinforced composite material in its fiber direction.

Patent Document 1: JP-B-61-29613
Patent Document 2: JP-B-62-34251
Patent Document 3: JP-A-5-65391
Patent Document 4: JP-A-7-224144
Patent Document 5: JP-A-2003-277579
Patent Document 6: JP-A-2006-257391

DISCLOSURE OF THE INVENTION

Problems to be Solved by the Invention

In view of the foregoing background of the related art, it is an object of the present invention to provide an epoxy resin composition having low viscosity, high Tg, high elastic modulus, and excellent fracture toughness and a fiber-reinforced composite material using such an epoxy resin composition which has excellent heat resistance, compressive strength, impact resistance, fatigue resistance, and open-hole tensile strength and which is optimum for producing structural parts of aircraft and the like.

In order to achieve the above object, the present invention provides the following means. More specifically, the present invention provides an epoxy resin composition comprising at least the following components (A), (B), and (C):

(A) at least one bifunctional epoxy resin represented by any one of the following formulas (I), (II), and (III):

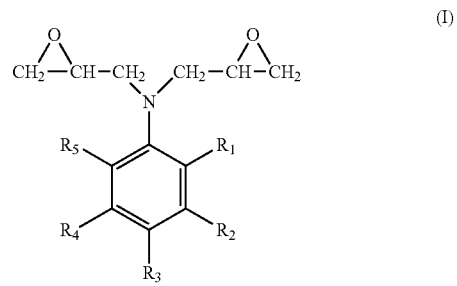

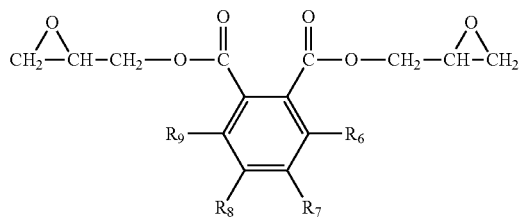

(II)

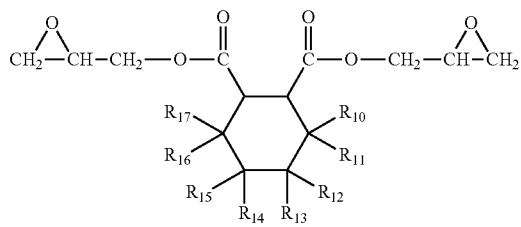

(III)

wherein $R_1$ to $R_{17}$ are each independently a substituent selected from among hydrogen, halogens, and C1 to C4 alkyl groups;

(B) a liquid aromatic diamine curing agent; and (C) core-shell polymer particles, wherein the core-shell polymer particles as the component (C) contain epoxy groups in their shell and have a volume-average particle size of 50 to 300 nm.

The epoxy resin composition according to the present invention preferably contains the component (A) in an amount of 15 to 60 parts by mass with respect to 100 parts by mass of a total epoxy resin. Further, the epoxy resin composition according to the present invention preferably further comprises a tri- or higher-functional aromatic epoxy resin as a component (D) in an amount of 30 to 70 parts by mass with respect to 100 parts by mass of the total epoxy resin.

The present invention also provides a fiber-reinforced composite material preferably comprising at least a cured product of the epoxy resin composition according to the present invention and carbon fibers. The fiber-reinforced composite material according to the present invention preferably uses, as a reinforcing fiber substrate made of carbon fibers, a non-crimp fabric comprising warps each composed of one or more strands of the carbon fibers, auxiliary warps each of which is a glass fiber bundle or a chemical fiber bundle and which are arranged in parallel with the warps, and wefts each of which is composed of one or more glass fibers or chemical fibers and which are arranged perpendicularly to the warps and the auxiliary warps and interlaced with the auxiliary warps to integrally hold the carbon fiber strands.

The present invention also provides a method for producing a fiber-reinforced composite material preferably comprising: placing, in an inside of a mold, a non-crimp fabric comprising warps each composed of strands of carbon fibers, auxiliary warps each of which is a glass fiber bundle or a chemical fiber bundle and which are arranged in parallel with the warps, and wefts each of which is composed of one or more glass fibers or chemical fibers and which are arranged perpendicularly to the warps and the auxiliary warps and interlaced with the auxiliary warps to integrally hold the carbon fiber strands; injecting the epoxy resin composition according to the present invention into the mold and impregnating the non-crimp fabric with the epoxy resin composition; and thermally curing the epoxy resin composition. In this case, the epoxy resin composition is preferably injected into the mold by evacuating the inside of the mold.

Effects of the Invention

According to the present invention, it is possible to provide an epoxy resin composition which has low viscosity allowing good impregnation of reinforcing fibers therewith, high Tg important to allow a fiber-reinforced composite material to have heat resistance, high elastic modulus important to allow a fiber-reinforced composite material to have excellent compressive strength, and excellent fracture toughness necessary to allow a fiber-reinforced composite material to have excellent impact resistance, fatigue resistance, and open-hole tensile strength. Therefore, a fiber-reinforced composite material comprising at least a cured product of the epoxy resin composition according to the present invention and carbon fibers is excellent in heat resistance, compressive strength, impact resistance, fatigue resistance, and open-hole tensile strength. Such a fiber-reinforced composite material is suitable for producing structural parts of aircraft, spacecraft, vehicles, ships, and the like.

BRIEF DESCRIPTION OF THE DRAWING

FIG. 1 is a schematic perspective view of a non-crimp fabric used in one embodiment of a fiber-reinforced composite material according to the present invention.

DESCRIPTION OF THE REFERENCE NUMERALS

1 Warp
2 Auxiliary warp
3 Weft

BEST MODE FOR CARRYING OUT THE INVENTION

The present inventors have extensively studied an epoxy resin composition having low viscosity, high Tg, high elastic modulus, and excellent fracture toughness, and as a result have found that an epoxy resin composition obtained by using, in combination, a bifunctional epoxy resin having a certain structure, a liquid aromatic diamine curing agent, and specific core-shell polymer particles containing epoxy groups in their shell and having a volume-average particle size of 50 to 300 nm satisfies all these characteristics. Although it is conventionally known that elasticity and fracture toughness are mutually contradictory characteristics, the present inventors have surprisingly found that both elastic modulus and fracture toughness can be improved by using, in combination, the above-mentioned bifunctional epoxy resin, liquid aromatic curing agent, and core-shell polymer particles used in the present invention.

In the present invention, the term "epoxy resin" refers to a compound having an epoxy group in its molecule, the term "epoxy resin composition" refers to an uncured composition containing an epoxy resin, a component for curing the epoxy resin (generally referred to as a "curing agent", "curing catalyst", or "curing accelerator"), and, if necessary, a modifier (e.g., plasticizer, dye, organic pigment, inorganic filler, polymer compound, antioxidant, ultraviolet absorber, coupling agent, surfactant), and the term "epoxy resin cured product" or "cured product" refers to a cured product obtained by curing the epoxy resin composition. Further, the term "amine curing agent" refers to a compound having an amine nitrogen atom and two or more active hydrogens in its molecule. It is to be noted that the term "active hydrogen" used herein refers to a hydrogen atom bonded to an amine nitrogen atom.

An epoxy resin represented by the above formula (I) used as a component (A) of an epoxy resin composition according to the present invention is obtained by reaction between aniline or its substituted derivative and epichlorohydrin. Here, $R_1$ to $R_5$ are each independently a substituent selected from among hydrogen, halogens, and C1 to C4 alkyl groups. From the view point of obtaining a cured product having high Tg, $R_1$ to $R_5$ are preferably each independently a substituent selected from among hydrogen and C1 to C4 alkyl groups. Further, from the viewpoint of imparting flame retardancy, at least one of $R_1$ to $R_5$ is preferably a halogen. Specific examples of the epoxy resin represented by the formula (I) include N,N-diglycidylaniline, N,N-diglycidyl-o-toluidine, N,N-diglycidyl-m-toluidine, N,N-diglycidyl-p-toluidine, N,N-diglycidyl-2,3-xylidine, N,N-diglycidyl-2,4-xylidine, N,N-diglycidyl-2,5-xylidine, N,N-diglycidyl-2,6-xylidine, N,N-diglycidyl-3,4-xylidine, N,N-diglycidyl-3,5-xylidine, 2-bromo-N,N-diglycidylaniline, 3-bromo-N,N-diglycidylaniline, and 4-bromo-N,N-diglycidylaniline.

An epoxy resin represented by the above formula (II) used as the component (A) is obtained by reaction between phthalic acid or its substituted derivative and epichlorohydrin. Here, $R_6$ to $R_9$ are each independently a substituent selected from among hydrogen, halogens, and C1 to C4 alkyl groups. From the viewpoint of obtaining a cured product having high Tg, $R_6$ to $R_9$ are preferably each independently a substituent selected from among hydrogen and C1 to C4 alkyl groups. Further, from the viewpoint of imparting flame retardancy, at least one of $R_5$ to $R_9$ is preferably a halogen. Specific examples of the epoxy resin represented by the formula (II) include phthalic acid diglycidyl ester, 3-methylphthalic acid diglycidyl ester, 4-methylphthalic acid diglycidyl ester, 3,4-dimethylphthalic acid diglycidyl ester, 3,5-dimethylphthalic acid diglycidyl ester, 3,6-dimethylphthalic acid diglycidyl ester, 4,5-dimethylphthalic acid diglycidyl ester, 3-bromophthalic acid diglycidyl ester, and 4-bromophthalic acid diglycidyl ester.

An epoxy resin represented by the above formula (III) used as the component (A) is obtained by reaction between hexahydrophthalic acid or its substituted derivative and epichlorohydrin. Here, $R_{10}$ to $R_{17}$ are each independently a substituent selected from among hydrogen, halogens, and C1 to C4 alkyl groups. From the viewpoint of obtaining a cured product having high Tg, $R_{10}$ to $R_{17}$ are preferably each independently a substituent selected from among hydrogen and C1 to C4 alkyl groups. Further, from the viewpoint of imparting flame retardancy, at least one of $R_{10}$ to $R_{17}$ is preferably a halogen. Specific examples of the epoxy resin represented by the formula (III) include hexahydrophthalic acid diglycidyl ester, 3-methylhexahydrophthalic acid diglycidyl ester, 4-methylhexahydrophthalic acid diglycidyl ester, 3,4-dimethylhexahydrophthalic acid diglycidyl ester, 3,5-dimethylhexahydrophthalic acid diglycidyl ester, 3,6-dimethylhexahydrophthalic acid diglycidyl ester, 4,5-dimethylhexahydrophthalic acid diglycidyl ester, 3-bromohexahydrophthalic acid diglycidyl ester, and 4-bromohexahydrophthalic acid diglycidyl ester.

The amount of the epoxy resin contained as the component (A) in the epoxy resin composition according to the present invention is preferably 15 to 60 parts by mass, more preferably 15 to 50 parts by mass, even more preferably 15 to 40 parts by mass, with respect to 100 parts by mass of a total epoxy resin. By setting the amount of the epoxy resin contained as the component (A) in the epoxy resin composition according to the present invention to a value within the above range, particularly excellent Tg, elastic modulus, and fracture toughness can be achieved. More specifically, by setting the amount of the epoxy resin contained as the component (A) in the epoxy resin composition according to the present invention to 15 parts by mass or more, a cured product having higher elastic modulus and higher fracture toughness can be obtained, and by setting the amount of the epoxy resin contained as the component (A) in the epoxy resin composition according to the present invention to 60 parts by mass or less, a cured product having higher Tg can be obtained.

It is to be noted that, in the present invention, the term "total epoxy resin" refers to a mixture of the component (A), a component (D), and one or more other epoxy resins. It is to be noted that when a component (C) is prepared as a masterbatch obtained by previously mixing core-shell polymer particles and an epoxy resin, the epoxy resin is included in the "total epoxy resin". However, the component (C) is not regarded as an epoxy resin, although the core-shell polymer particles used as the component (C) contain an epoxy resin in their shell.

Further, the epoxy resin composition according to the present invention preferably contains a tri- or higher-functional aromatic epoxy resin as a component (D) to obtain a cured product having high Tg. The amount of the tri- or higher-functional aromatic epoxy resin contained as the component (D) in the epoxy resin composition according to the present invention is preferably 30 to 70 parts by mass, more preferably 40 to 70 parts by mass, even more preferably 50 to 70 parts by mass, with respect to 100 parts by mass of the total epoxy resin. More specifically, by setting the amount of the tri- or higher-functional aromatic epoxy resin contained as the component (D) in the epoxy resin composition according to the present invention to 30 parts by mass or more, a cured product having higher Tg and higher elastic modulus can be obtained, and by setting the amount of the tri- or higher-aromatic epoxy resin contained as the component (D) in the epoxy resin composition according to the present invention to 70 parts by mass or less, a cured product having higher fracture toughness can be obtained. It is to be noted that the term "tri- or higher-functional aromatic epoxy resin" used herein refers to a compound having three or more epoxy groups and an aromatic ring in its molecule.

From the viewpoint of obtaining a cured product having excellent balance among Tg, elastic modulus, and toughness, the tri- or higher-functional aromatic epoxy resin used as the component (D) is preferably a glycidyl amine-type epoxy resin such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-diaminodiphenylmethane, N,N,N',N'-tetraglycidyl-4,4'-diamino-3,3'-diethyldiphenylmethane, or N,N,N',N'-tetraglycidyl-m-xylylenediamine.

The epoxy resin composition according to the present invention may further contain an epoxy resin other than the components (A) and (D). Such an epoxy resin to be used in the present invention preferably has two or more epoxy groups in one molecule from the viewpoint of obtaining a cured product having high Tg and high elastic modulus. Examples of such an epoxy resin include bi- or higher-functional glycidyl ether-type epoxy resins. Examples thereof include glycidyl ether-type epoxy resins obtained by reaction between epichlorohydrin and bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris (p-hydroxyphenyl)methane, or tetrakis(p-hydroxyphenyl) ethane. Other examples of the epoxy resin other than the components (A) and (D) include epoxy resins having a dicyclopentadiene skeleton, epoxy resins having a biphenylaralkyl skeleton, and triglycidyl isocyanurate. Further, the epoxy resin composition according to the present invention may further contain an aliphatic epoxy resin and/or an alicyclic epoxy resin as long as Tg is not significantly lowered.

When the structures and amounts of the components (A) and (D) and one or more other epoxy resins contained in the epoxy resin composition according to the present invention are unknown, they can be determined by dissolving the epoxy resin composition in a solvent if necessary, separating the epoxy resin composition into its components by HPLC (High Performance Liquid Chromatography), and analyzing each of the separated components by NMR (Nuclear Magnetic Resonance). The amount of each of the components contained in the epoxy resin composition (i.e., the ratio of each component to the sum of all the components of the epoxy resin composition) can be determined from the area of each peak detected by HPLC and the structure of each of the components can be determined from its NMR spectrum. Further, a cured product of the epoxy resin composition according to the present invention can be analyzed by thermo GC/MS (Gas Chromatography/Mass Spectrum).

A component (B) of the epoxy resin composition according to the present invention is a liquid aromatic diamine curing agent. It is to be noted that the term "liquid" used herein means that the aromatic diamine curing agent is liquid at 25° C. and 0.1 MPa, and the term "aromatic diamine curing agent" refers to a compound having two amine nitrogen atoms directly bonded to an aromatic ring and two or more active hydrogens in its molecule. The term "active hydrogen" used herein refers to a hydrogen atom bonded to an amine nitrogen atom. In order to achieve good impregnation of reinforcing fibers with the epoxy resin composition according to the present invention, a diamine curing agent used as the component (B) needs to be liquid. Further, in order to obtain a cured product having high Tg, a diamine curing agent used as the component (B) needs to be aromatic.

Examples of the liquid aromatic diamine curing agent used as the component (B) include 4,4'-methylenebis(2-ethylaniline), 4,4'-methylenebis(2-isopropylaniline), 4,4'-methylenebis(N-methylaniline), 4,4'-methylenebis(N-ethylaniline), 4,4'-methylenebis(N-sec-butylaniline), N,N'-dimethyl-p-phenyelendiamine, N,N'-diethyl-p-phenylenediamine, N,N'-di-sec-butyl-p-phenylenediamine, 2,4-diethyl-1,3-phenylenediamine, 4,6-diethyl-1,3-phenylenediamine, 2,4-diethyl-6-methyl-1,3-phenylenediamine, and 4,6-diethyl-2-methyl-1,3-phenylenediamine. These liquid aromatic diamine curing agents may be used singly or in combination of two or more of them. Alternatively, the liquid aromatic diamine curing agent may be used together with one or more other amine curing agents. From the viewpoint of achieving low viscosity and good impregnation of reinforcing fibers with the epoxy resin composition according to the present invention, any one of liquid aromatic diamine curing agents represented by the following formulas (IV) to (VI) or a mixture of two or more of them is preferably used. As such a liquid aromatic diamine curing agent, "jER Cure™" W manufactured by Japan Epoxy Resins Co., Ltd. can be used. From the viewpoint of obtaining a cured product having high Tg, $R_{18}$ to $R_{29}$ are preferably each independently a substituent selected from among hydrogen and C1 to C4 alkyl groups. Further, from the viewpoint of imparting flame retardancy, at least one of $R_{18}$ to $R_{21}$, at last one of $R_{22}$ to $R_{25}$, and at least one of $R_{26}$ to $R_{29}$ are preferably a halogen.

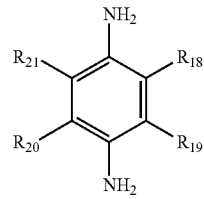

(IV)

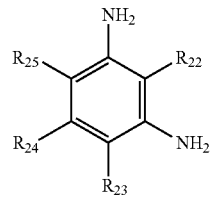

(V)

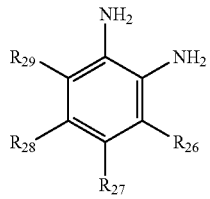

(VI)

wherein $R_{18}$ to $R_{29}$ are each independently a substituent selected from among hydrogen, halogens, and C1 to C4 alkyl groups.

The epoxy resin composition according to the present invention may further contain an amine curing agent other than the component (B). Examples of such an amine curing agent other than the component (B) include solid aromatic diamine compounds such as 4,4'-diaminodiphenylmethane, 3,3'-diaminodiphenylsulfone, and 4,4'-diaminodiphenylsulfone. From the viewpoint of obtaining a cured product having high Tg and high toughness, such a solid aromatic diamine compound is preferably used by dissolving it in any one of liquid aromatic diamine curing agents represented by the above formulas (IV) to (VI) or a mixture of two or more of them. Particularly, from the viewpoint of obtaining a cured product having particularly excellent Tg and toughness, diaminodiphenylsulfone is preferably used by dissolving it in any one of liquid aromatic diamine curing agents represented by the above formulas (IV) to (VI) or a mixture of two or more of them.

In general, diaminodiphenylsulfone tends to be easily crystallized, and therefore even when dissolved in a liquid aromatic diamine curing agent at high temperature, diaminodiphenylsulfone is likely to be deposited as crystals in the course of cooling. However, when two isomers of diaminodiphenylsulfone, that is, 3,3'-diaminodiphenylsulfone and 4,4'-diaminodiphenylsulfone are mixed with any one of liquid aromatic diamine curing agents represented by the above formulas (IV) to (VI) or a mixture of two or more of them, deposition of crystals is much less likely to occur than when one of the isomers of diaminodiphenylsulfone is mixed with any one of liquid aromatic diamine curing agents represented by the above formulas (IV) to (VI) or a mixture of two or more of them. The amount of diaminodiphenylsulfone contained in the epoxy resin composition according to the present invention is preferably 10 to 40 parts by mass, more preferably 20 to 35 parts by mass, with respect to 100 parts by mass of a total amine curing agent. More specifically, by setting the amount of diaminodiphenylsulfone contained in the epoxy resin composition according to the present invention to 10 parts by mass or more, a cured product having higher Tg and higher toughness can be obtained, and by setting the amount of diaminodiphenylsulfone contained in the epoxy resin composition according to the present invention to 40 parts by mass or less, deposition of crystals can be more effectively suppressed. When 3,3'-diaminodiphenylsulfone and 4,4'-diaminodiphenylsulfone are used in combination to suppress deposition of crystals, the mass ratio between them is preferably 10:90 to 90:10. When the mass ratio between 3,3'-diaminodiphenylsulfone and 4,4'-diaminodiphenylsulfone is closer to 50:50, the effect of suppressing the deposition of crystals becomes higher.

If necessary, the epoxy resin composition according to the present invention may further contain, as another component, a curing accelerator, a plasticizer, a dye, a pigment, an inorganic filler, an antioxidant, an ultraviolet absorber, a coupling agent, and/or a surfactant.

The epoxy resin composition according to the present invention is made curable by mixing an epoxy resin and an amine curing agent in a predetermined ratio. The mixing ratio between the epoxy resin and the amine curing agent is determined depending on the kind of epoxy resin used and the kind of amine curing agent used. More specifically, the epoxy resin and the amine curing agent are mixed in such a manner that the ratio between the number of epoxy groups contained in the epoxy resin in the epoxy resin composition and the number of active hydrogens contained in the amine curing agent in the epoxy resin composition is preferably 0.7 to 1.3, more preferably 0.8 to 1.2. By setting such a ratio to 0.7 to 1.3, a cured product having higher Tg and higher elastic modulus can be obtained.

It is generally known that a cross-linking reaction proceeds slowly in the case of using a liquid aromatic diamine curing agent to be used as the component (B) of the epoxy resin composition according to the present invention. Therefore, the component (B) of the epoxy resin composition according to the present invention may contain a curing accelerator for accelerating a cross-linking reaction. Such a curing accelerator contained in the component (B) is preferably small in size so that the concentration of the curing accelerator can be made uniform in reinforcing fiber bundles impregnated with the epoxy resin composition according to the present invention when a fiber-reinforced composite material according to the present invention is produced using the epoxy resin composition according to the present invention. More specifically, the volume-average particle size of the curing accelerator is preferably 0.5 µm or less, more preferably 0.1 µm or less. Even more preferably, the curing accelerator is completely dissolved in the liquid aromatic curing agent used as the component (B) so that the liquid aromatic diamine curing agent contains no solid matter. By satisfying the foregoing requirement, a fiber-reinforced composite material having stable mechanical properties can be obtained. It is to be noted that the term "completely dissolved" used herein means that a liquid product having no solid matter and no concentration distribution is formed and deposition of crystals does not occur even when the liquid product is allowed to stand at 25° C. for 1 month or longer.

Examples of the curing accelerator contained in the component (B) of the epoxy resin composition according to the present invention include tertiary amines, Lewis acid complexes, onium salts, imidazole, and phenol compounds. Particularly, t-butyl catechol as a phenol compound is preferably used, because its reaction-accelerating effect is enhanced at temperatures of 100° C. or higher but is low at temperatures of 50 to 80° C. Therefore, the epoxy resin composition according to the present invention can have a long pot life before curing but can be quickly cured at a curing temperature during curing process when a fiber-reinforced composite material using the epoxy resin composition according to the present invention is molded.

The amount of the curing accelerator contained in the component (B) of the epoxy resin composition according to the present invention is preferably 0.5 to 3 parts by mass, more preferably 1 to 2.5 parts by mass, with respect to 100 parts by mass of the total epoxy resin. If the amount of the curing accelerator, especially t-butyl catechol, contained in the component (B) is not within the above range, a balance between viscosity increase during resin injection and a reaction rate at an elevated temperature is affected.

The component (C) of the epoxy resin composition according to the present invention is core-shell polymer particles. The term "core-shell polymer particles" used herein refers to particles obtained by partially or fully coating the surface of particles as a core mainly made of a polymer with a polymer different from the polymer constituting the core by, for example, graft polymerization.

The core of the core-shell polymer particles used as the component (C) is made of a silicone resin or a polymer obtained by polymerization of one or more of monomers selected from among conjugated diene-based monomers, acrylic acid ester-based monomers, and methacrylic acid ester-based monomers.

Examples of the conjugated diene-based monomers include butadiene, isoprene, and chloroprene. The core is preferably made of a cross-linked polymer obtained from one or more of the conjugated diene-based monomers. From the viewpoint of obtaining a polymer having excellent properties and of easily performing polymerization, butadiene is preferably used as the conjugated diene-based monomer, that is, the core is preferably made of a polymer obtained by polymerization of a monomer containing butadiene.

The core-shell polymer particles used as the component (C) need to contain epoxy groups in their shell. During the curing process of the epoxy resin composition, hydroxyl groups are generated and therefore the polarity of the epoxy resin is changed. As a result, agglomeration of the core-shell polymer particles occurs due to a difference in polarity between the core-shell polymer particles and the epoxy resin, which may cause a problem that a sufficient toughness-improving effect cannot be obtained. However, by introducing epoxy groups into the shell of the core-shell polymer particles, a highly-dispersed state of the core-shell polymer particles can be achieved because hydroxyl groups are generated by reaction with the amine curing agent during curing process and the core-shell polymer particles are finally incorporated into a cured product. As a result, a sufficient toughness-improving effect of the core-shell polymer particles can be obtained even when the amount of the core-shell polymer particles contained in the epoxy resin composition according to the present invention is small. This makes it possible to improve the toughness of the epoxy resin composition according to the present invention while maintaining high Tg and high elastic modulus. Epoxy groups can be introduced into the shell of the core-shell polymer particles by, for example, performing, on the surface of the core, graft polymerization of a monomer containing a glycidyl group-containing acrylic acid ester-based monomer and/or a glycidyl group-containing methacrylic acid ester-based monomer. In order to improve the dispersibility of the core-shell polymer particles and to obtain a sufficient toughness-improving effect, the shell of the core-shell polymer particles may further contain hydroxyl groups and/or carboxyl groups.

The core-shell polymer particles used as the component (C) need to have a volume-average particle size of 50 to 300 nm, preferably 50 to 200 nm, more preferably 50 to 150 nm. It is to be noted that the volume-average particle size can be measured using a nanotrac particle size analyzer (manufactured by NIKKISO Co., Ltd., dynamic light scattering method). Alternatively, the volume-average particle size may be measured by observing a thin section of a cured product cut by a microtome with a TEM to obtain a TEM image and processing the TME image using image processing software. In this case, it is necessary to measure the particle size of at least 100 particles to determine an average particle size. When the volume-average particle size of the core-shell polymer particles is 50 nm or larger, the toughness-improving effect of the core-shell polymer particles is high because the specific surface area of the core-shell polymer particles is moderately small, which is energetically favorable and therefore agglomeration is less likely to occur. When the volume-average particle size of the core-shell polymer particles is 300 nm or smaller, the toughness-improving effect of the core-shell polymer particles is high because the distance between the core-shell polymer particles is moderately small. The mechanism of improvement in the toughness of a cured product by core-shell polymer particles is based on that cavitation of the core-shell polymer particles occurs in the vicinity of a crack tip of the cured product, which induces plastic deformation of a surrounding resin, leading to energy absorption. Therefore, it can be considered that when the distance between core-shell polymer particles is moderately small, plastic deformation of a resin is likely to occur.

A method for producing the core-shell polymer particles used as the component (C) is not particularly limited, and core-shell polymer particles produced by a well-known method can be used as the component (C). In usual, core-shell polymer particles are available as powder obtained by taking out a mass of core-shell polymer particles and pulverizing it, and therefore such a core-shell polymer powder is often dispersed in an epoxy resin again. In this case, however, there is a problem that it is difficult to stably disperse core-shell polymer particles in the form of primary particles. Therefore, core-shell polymer particles are preferably prepared as a masterbatch, in which core-shell polymer particles are finally dispersed as primary particles in an epoxy resin, without once taking out a mass of core-shell polymer particles in the course of production. Such core-shell polymer particles can be produced by, for example, a method disclosed in JP-A-2004-315572. According to this method, a suspension in which core-shell polymer particles are dispersed is first obtained by a method for polymerizing a core-shell polymer in an aqueous medium typified by emulsion polymerization, dispersion polymerization, or suspension polymerization. Then, the suspension is mixed with an organic solvent having partial solubility in water, such as an ether-based solvent (e.g., acetone or methyl ethyl ketone), and the thus obtained mixture is brought into contact with an aqueous electrolyte such as sodium chloride or potassium chloride to separate it into an organic solvent phase and an aqueous phase. The aqueous phase is removed to obtain an organic solvent in which the obtained core-shell polymer particles are dispersed. Then, an epoxy resin is mixed with the organic solvent, and then the organic solvent is removed by evaporation to obtain a masterbatch in which the core-shell polymer particles are dispersed as primary particles in the epoxy resin. As an epoxy masterbatch having core-shell polymer particles dispersed therein prepared by such a method, "Kane Ace™" commercially available from Kaneka Corporation can be used.

The amount of the core-shell polymer particles contained as the component (C) in the epoxy resin composition according to the present invention is preferably 1 to 12 parts by mass, more preferably 1 to 7 parts by mass, even more preferably 3 to 7 parts by mass, with respect to 100 parts by mass of the total epoxy resin. More specifically, by setting the amount of the core-shell polymer particles contained as the component (C) in the epoxy resin composition according to the present invention to 1 part by mass or more, a cured product having higher fracture toughness can be obtained, and by setting the amount of the core-shell polymer particles contained as the component (C) in the epoxy resin composition according to the present invention to 12 parts by mass or less, a cured product having higher Tg and higher elastic modulus can be obtained.

The epoxy resin composition according to the present invention and the fiber-reinforced composite material according to the present invention using the epoxy resin composition according to the present invention are suitable for producing structural parts, especially aircraft structural parts. Fiber-reinforced composite materials used for aircraft are often required to have high heat resistance. Epoxy resin cured products are amorphous and have glass transition temperature. The stiffness of epoxy resin cured products is significantly lowered in an atmosphere having a temperature equal to or higher than their glass transition temperature, which leads to deterioration of mechanical properties of fiber-reinforced composite materials. For this reason, the glass transition temperature of an epoxy resin cured product is used as an indicator of heat resistance of a fiber-reinforced composite material. There is a correlation between the glass transition temperature of an epoxy resin cured product and a peak temperature in the thermal history of its curing process. In the case of fiber-reinforced composite materials for aircraft, the peak temperature in curing process is often about 180° C. Therefore, the glass transition temperature of a cured product obtained by finally thermally curing the epoxy resin composition according to the present invention at 180° C. for 2 hours is preferably 180° C. or higher, more preferably 190° C. or higher. However, since it is said that the pyrolytic temperature of an epoxy resin is about 240° C. irrespective of whether it is in an uncured state or a cured state, the upper limit of the glass transition temperature is substantially equal to or less than the pyrolytic temperature.

On the other hand, fiber-reinforced composite materials used for aircraft flying at particularly high altitudes are exposed to an atmosphere having a very low temperature of −50° C. or lower, and therefore it is particularly important for such fiber-reinforced composite materials to have high fracture toughness at extremely low temperatures. For this reason, the core of the core-shell polymer particles used in the epoxy resin composition according to the present invention needs to have a glass transition temperature lower than that of a cured product obtained by curing the epoxy resin composition according to the present invention by 210° C. or more, preferably 220° C. or more. More specifically, the core has a glass transition temperature of −30° C. or lower, preferably −40° C. or lower, and is preferably made of a polymer obtained by polymerization of a monomer containing butadiene. In a case where it is difficult to measure the glass transition temperature of the core after it is coated with a shell, the glass transition temperature of the core may be previously measured by forming only a core polymer and then determining the glass transition temperature of the core polymer with a thermal analysis instrument such as a DSC.

In usual, epoxy resin compositions are divided into two types, one-component type and two-component type. A one-component type epoxy resin composition is produced by previously mixing an epoxy resin and a curing agent component capable of curing the epoxy resin. On the other hand, in the case of a two-component type epoxy resin composition, an epoxy resin and a curing agent are separately stored and mixed together just before use.

In the case of a one-component type epoxy resin composition, curing reaction proceeds even during storage, and therefore a solid curing agent having low reactivity is often selected as a curing agent component. However, as described above, since curing reaction proceeds at room temperature slowly but steadily, such a one-component type epoxy resin composition needs to be refrigerated during storage, which increases its storage cost. Further, as described above, since a solid curing agent is used, a high pressure needs to be applied to the one-component type epoxy resin composition by a press roll to impregnate the reinforcing fibers with it, which increases the production cost of a fiber-reinforced composite material.

On the other hand, in the case of a two-component type epoxy resin composition, a base component composed of an epoxy resin and a curing agent are separately stored, and therefore its storage conditions are not particularly limited and long-term storage is achieved. Further, since both the base component and the curing agent can be made liquid, a liquid mixture having low viscosity can be obtained by mixing the base component and the curing agent. Therefore, reinforcing fibers can be impregnated with the two-component type epoxy resin composition and then molded by a simple method such as RTM (Resin Transfer Molding).

The epoxy resin composition according to the present invention may be either of a one-component type or a two-component type, but is preferably of a two-component type in view of the above advantages.

In a case where the epoxy resin composition according to the present invention is of a two-component type, abase component is preferably composed of an epoxy resin obtained by mixing the component (A) used in the present invention and, if necessary, the component (D) and core-shell polymer particles used as the component (C) in the present invention, and a curing agent is preferably one obtained by mixing and dissolving together the component (B) used in the present invention and, if necessary, an aromatic diamine other than the component (B) and a curing accelerator.

In a case where the epoxy resin composition according to the present invention is of a two-component type, the viscosity of its main component at 70° C. is 500 mPa·s or less, preferably 300 mPa·s or less. It is to be noted that the viscosity is measured according to "Method of measurement of viscosity using cone-plate rotary viscometer" specified in JIS Z 8803 (1991) with the use of an E-type viscometer equipped with a standard cone rotor (1°34'×R24) (TVE-30H manufactured by Toki Sangyo Co., Ltd.) at a rotation speed of 50 rpm. If the viscosity of the base component at 70° C. is higher than 500 mPa·s, there is a case where removal of the base component from a container, weighing, mixing with the curing agent, and deaeration are not efficiently performed. The viscosity of the base component at 70° C. can be made 500 mPa·s or less by preventing an epoxy resin having a molecular weight of 500 or more from being contained in the base component in an amount of preferably 30 parts by mass or more with respect to 100 parts by mass of the base component and by preventing a particulate additive such as a core-shell polymer from being contained in the base component in an amount of preferably 12 parts by mass or more. The lower limit of the viscosity of the base component at 70° C. is not particularly limited, but is preferably as low as possible because good impregnation of reinforcing fibers with the epoxy resin composition according to the present invention is achieved and therefore a high-quality fiber-reinforced composite material can be obtained.

Further, in a case where the epoxy resin composition according to the present invention is of a two-component type, the viscosity of its curing agent at 70° C. is 500 mPa·s or less, preferably 300 mPa·s or less. It is to be noted that the viscosity of the curing agent can be measured in the same manner as described above with reference to a case where the viscosity of the base component is measured. If the viscosity of the curing agent at 70° C. is higher than 500 mPa·s, there is a case where removal of the curing agent from a container, weighing, mixing with the base component, and deaeration are not efficiently performed. The lower limit of the viscosity of the curing agent at 70° C. is not particularly limited, and is preferably as low as possible because good impregnation of reinforcing fibers with the epoxy resin composition according to the present invention is achieved and therefore a high-quality fiber-reinforced composite material can be obtained. As described above, the viscosity of the curing agent at 70° C. can be made 500 mPa·s or less by preventing a solid aromatic diamine curing agent such as diaminodiphenylsulfone from being contained in the curing agent in an amount of 40 parts by mass or more with respect to 100 parts by mass of the total amine curing agent and by preventing a particulate additive such as a core-shell polymer from being contained in the curing agent in an amount of 15 parts by mass or more.

Further, the initial viscosity of the epoxy resin composition according to the present invention at 70° C. is preferably 500 mPa·s or less, more preferably 400 mPa·s or less, even more preferably 300 mPa·s or less. It is to be noted that the initial viscosity of the epoxy resin composition according to the present invention can be measured in the same manner as described above with reference to a case where the viscosity of the base component or the curing agent is measured. The initial viscosity of the epoxy resin composition according to the present invention is measured after the epoxy resin composition is maintained at 70° C. for 5 minutes after its preparation. By setting the initial viscosity of the epoxy resin composition according to the present invention at 70° C. to 500 mPa·s or less, excellent impregnation of reinforcing fibers with the epoxy resin composition according to the present invention is achieved and therefore a higher-quality fiber-reinforced composite material can be obtained.

A cured product of the epoxy resin composition according to the present invention can be obtained by thermally curing the epoxy resin composition according to the present invention at any temperature in a range of preferably 50 to 200°

C. for any length of time in a range of preferably 0.5 to 10 hours, depending on the activity of the component (B), an amine curing agent other than the component (B), and a curing accelerator used. The thermal curing of the epoxy resin composition according to the present invention may be performed either by one-stage heating or multi-stage heating under different heating conditions. When the curing temperature of the epoxy resin composition according to the present invention is higher, an obtained fiber-reinforced composite material can have higher heat resistance. However, when the heating temperature of the epoxy resin composition heated in the inside a mold during molding is higher, the cost of facilities and heat source is increased and the length of time during which the mold is occupied by the epoxy resin composition is also increased, which is economically disadvantageous. Therefore, a cured product of the epoxy resin composition according to the present invention is preferably obtained by performing initial curing at any temperature in the range of 50 to 140° C., demolding a molded product, and finally curing the molded product at a relatively-high temperature with the use of a heating apparatus such as an oven.

A desired resin cured product suitable for aircraft structural parts can be obtained by, for example, performing final curing at a temperature of 180° C. for 1 to 10 hours.

The mode I fracture toughness ($G_{IC}$) of a cured product of the epoxy resin composition according to the present invention at 25° C. is preferably 150 J/m$^2$, more preferably 200 J/m$^2$, even more preferably 250 J/m$^2$. The measurement of $G_{IC}$ is performed at 25° C. in accordance with ASTM D5045-99 using a cured product obtained by curing the epoxy resin composition at 180° C. for 2 hours. When the $G_{IC}$ is 150 J/m$^2$ or more, a fiber-reinforced composite material having excellent impact resistance, fatigue resistance, and open-hole tensile strength can be obtained.

Further, the mode I fracture toughness ($G_{IC}$) of a cured product of the epoxy resin composition according to the present invention at −54° C. is preferably 120 J/m$^2$, more preferably 170 J/m$^2$, even more preferably 220 J/m$^2$. It is to be noted that the measurement of $G_{IC}$ is performed at −54° C. in accordance with ASTM D5045-99 using a cured product obtained by curing the epoxy resin composition at 180° C. for 2 hours. When the $G_{IC}$ is 150 J/m$^2$ or more, a fiber-reinforced composite material having excellent impact resistance, fatigue resistance, and open-hole tensile strength at low temperatures can be obtained.

The flexural modulus of a cured product of the epoxy resin composition according to the present invention at 25° C. is preferably in the range of 2.5 to 4.5 GPa, more preferably in the range of 3.0 to 4.5 GPa, even more preferably in the range of 3.5 to 4.5 GPa. It is to be noted that the measurement of the flexural modulus is performed at 25° C. in accordance with JIS K7171-1994 using a cured product obtained by curing the epoxy resin composition at 180° C. for 2 hours. When the flexural modulus is 2.5 GPa or more, a fiber-reinforced composite material having high compressive strength can be obtained. When the flexural modulus is 4.5 GPa or less, a fiber-reinforced composite material having excellent impact resistance, fatigue resistance, and open-hole tensile strength can be obtained.

Examples of reinforcing fibers to be used in the present invention include glass fibers, carbon fibers, and aramid fibers. Among them, carbon fibers are preferably used from the viewpoint of obtaining a lightweight fiber-reinforced composite material having excellent mechanical properties such as strength and elastic modulus.

Examples of such carbon fibers to be used in the present invention include PAN-based carbon fibers, pitch-based carbon fibers, and rayon-based carbon fibers. Among them, PAN-based carbon fibers are preferably used due to its high tensile strength.

From the viewpoint of obtaining a lightweight fiber-reinforced composite material having excellent elastic modulus, the tensile elastic modulus of carbon fibers to be used in the present invention is preferably 200 GPa or more, more preferably 250 GPa or more, even more preferably 280 GPa or more. By using carbon fibers having a tensile elastic modulus of 200 GPa or more, a fiber-reinforced composite material having higher weight-reducing effect and higher elastic modulus can be obtained.

Further, as carbon fibers to be used in the present invention, flat yarn such as one disclosed in Japanese Patent No. 2955145 is preferably used. Such flat yarn has a fineness of 3000 to 20000 deniers, a yarn width of 4 to 16 mm, and a ratio of yarn width to yarn thickness of 30 or more. By using such flat yarn, a reinforcing fiber substrate whose crimps of carbon fiber strands are small can be obtained and therefore a fiber-reinforced composite material having excellent mechanical properties such as compressive strength can be obtained.

The reinforcing fibers to be used in the present invention may be used in the form of a reinforcing fiber substrate composed of one or more kinds of the above-mentioned reinforcing fibers and, if necessary, one or more kinds of other chemical fibers. Such a reinforcing fiber substrate preferably contains at least carbon fibers. Examples of the reinforcing fiber substrate to be used in the present invention include those obtained by arranging reinforcing fibers in substantially one direction, fabrics, knits, braids, and mats. Among them, a so-called unidirectional fabric obtained by fixing reinforcing fibers arranged in substantially one direction by glass fibers or chemical fibers is preferably used from the viewpoint of obtaining a fiber-reinforced composite material having a high fiber volume content.

Examples of such a unidirectional fabric to be used in the present invention include a plain-woven fabric obtained by interlacing warps each composed of one or more carbon fiber strands with wefts each of which is composed of one or more glass fibers or chemical fibers and which are perpendicular to the warps and a non-crimp fabric shown in FIG. 1 comprising warps (shown by reference numeral 1 in FIG. 1) each composed of one or more carbon fiber strands, auxiliary warps (shown by reference numeral 2 in FIG. 1) each of which is composed of a glass fiber bundle or a chemical fiber bundle and which are arranged in parallel with the warps, and wefts (shown by reference numeral 3 in FIG. 1) each of which is composed of one or more glass fibers or chemical fibers and which are arranged perpendicularly to the warps and auxiliary warps and interlaced with the auxiliary warps to integrally hold the carbon fiber strands. Among them, a non-crimp fabric is preferably used from the viewpoint of achieving excellent straightness of carbon fibers and obtaining a fiber-reinforced composite material having excellent compressive strength. Particularly, a fiber-reinforced composite material composed of a cured product of the epoxy resin composition according to the present invention and a non-crimp fabric has particularly excellent compressive strength due to a synergistic effect between the non-crimp fabric having excellent straightness of carbon fibers and the cured product having high elastic modulus, and further has particularly excellent impact resistance, fatigue resistance, and open-hole tensile strength.

The fineness of each auxiliary warp of a unidirectional fabric to be used in the present invention is preferably 20% or less, more preferably 10% or less, even more preferably 5% or less of that of each warp composed of one or more carbon fiber strands. By setting the fineness of each auxiliary warp of a unidirectional fabric to be used in the present invention to a value within the above range, the auxiliary warps are more easily deformed than the carbon fiber strands and therefore a unidirectional fabric whose crimps of the carbon fiber strands are small can be obtained, which makes it possible to obtain a fiber-reinforced composite material having more excellent mechanical properties such as compressive strength.

The fineness of each weft of a unidirectional fabric to be used in the present invention is preferably 20% or less, more preferably 10% or less, even more preferably 5% or less of that of each warp composed of one or more carbon fiber strands. By setting the fineness of each weft of a unidirectional fabric to be used in the present invention to a value within the above range, a unidirectional fabric whose crimps of the carbon fiber strands formed at intersecting points between the warps and the wefts are small can be obtained, which makes it possible to obtain a fiber-reinforced composite material having more excellent mechanical properties such as compressive strength.

If necessary, a binder may be attached to the reinforcing fiber substrate to be used in the present invention for the purpose of preventing misalignment of reinforcing fibers, temporarily bonding reinforcing fiber substrates together, and obtaining a fiber-reinforced composite material having improved impact resistance. The composition of the binder is not particularly limited, and any existing binder can be used. However, a binder mainly composed of a thermoplastic resin is preferably used because the aforementioned purposes can be achieved and, in addition, its physical properties are not significantly changed during storage.

In a case where the fiber-reinforced composite material according to the present invention is used for aircraft structural parts, it is required to have excellent heat resistance, and therefore the thermoplastic resin to be used as a binder is preferably an engineering plastic having a high glass transition temperature. Particularly preferred examples of such an engineering plastic include polysulfone, polyethersulfone, polyimide, and polyetherimide.

A binder composition composed of a thermoplastic resin preferably contains an appropriate plasticizer component to adjust its glass transition temperature to a value within an appropriate range, more specifically within a range of 50 to 70° C. As such a plasticizer component, a compound that can be reacted with the epoxy resin composition according to the present invention is preferably used. The plasticizer component is particularly preferably an epoxy resin. The epoxy resin to be used as a plasticizer component is not particularly limited, and examples thereof include: glycidyl ether-type epoxy resins obtained by reaction between epichlorohydrin and bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, or tetrakis(p-hydroxyphenyl)ethane; epoxy resins having a dicyclopentadiene skeleton; epoxy resins having a biphenylaralkyl skeleton; triglycidyl isocyanurate; and glycidyl amine-type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-diaminodiphenylmethane, N,N,N',N'-tetraglycidyl-4,4'-diamino-3,3'-diethyldiphenylmethane, and N,N,N',N'-tetraglycidyl-m-xylylenediamine. Examples of the plasticizer component other than epoxy resins include polyphenols, polyamines, polycarboxylic acids, polycarboxylic acid anhydrides, polyacrylates, and sulfoneamindes.

The reinforcing fiber volume content of the fiber-reinforced composite material according to the present invention is preferably 45 to 70%, more preferably 50 to 65%, even more preferably 55 to 60%. When the reinforcing fiber volume content of the fiber-reinforced composite material according to the present invention is 45% or higher, the fiber-reinforced composite material has excellent weight-reducing effect and higher elastic modulus. When the reinforcing fiber volume content of the fiber-reinforced composite material according to the present invention is 70% or less, lowering of strength of the fiber-reinforced composite material due to rubbing between reinforcing fibers can be prevented and the fiber-reinforced composite material has excellent mechanical properties such as tensile strength.

As a method for molding the fiber-reinforced composite material according to the present invention, a method for obtaining a fiber-reinforced composite material by impregnating reinforcing fibers with a liquid epoxy resin composition and then curing the epoxy resin composition is preferably employed from the viewpoint of efficiently obtaining a fiber-reinforced composite material. Examples of such a method include a hand lay-up method, a filament winding method, and a pultrusion method, and a RTM (Resin Transfer Molding) method. Among these methods, a RTM method is preferably employed from the viewpoint of efficiently obtaining a fiber-reinforced composite material having a complicated shape. The term "RTM method" used herein refers to a method for obtaining a fiber-reinforced composite material by impregnating a reinforcing fiber substrate placed in the inside of a mold with a liquid epoxy resin composition and then curing the epoxy resin composition.

In the RTM method to be employed in the present invention, a mold to be used may be either a closed mold made of a stiff material or an open mold made of a stiff material and used together with a flexible film (bag). In the latter case, a reinforcing fiber substrate can be placed between the open mold made of a stiff material and the flexible film. Examples of the stiff material include various existing materials such as metals (e.g., steel, aluminum), fiber-reinforced plastics (FRP), wood, and plaster. Examples of a material of the flexible film include polyamides, polyimides, polyesters, fluorine resins, and silicone resins.

In the RTM method using a closed mold made of a stiff material, the mold is usually closed under pressure and an epoxy resin composition for fiber-reinforced composite material is injected into the inside of the mold under pressure. In this case, a suction port to be connected to a vacuum pump may be provided separately from an injection port to inject the epoxy resin composition into the inside of the mold by suction. When suction is performed, the epoxy resin composition may be injected into the inside of the mold only at atmospheric pressure without using any special pressurizing means. This method is preferably employed because a large-sized member can be produced by providing a plurality of suction ports.

In the RTM method using an open mold made of a stiff material together with a flexible film, suction is usually performed to inject an epoxy resin into the inside of the mold only at atmospheric pressure without using any special pressurizing means. In order to achieve good impregnation of a reinforcing fiber substrate with the epoxy resin by injecting the epoxy resin only at atmospheric pressure, the use of a resin distribution medium is effective. Further, before a reinforcing fiber substrate or a preform composed of reinforcing fibers is placed in the inside of a mold, a gel coat is preferably applied to the surface of a stiff material constituting the mold.

It is to be noted that when a closed mold made of a stiff material is used as a mold, the term "inside of a/the mold" refers to the inside of a cavity formed by the closed mold, and when an open mold made of a stiff material and a flexible film are used, the term "inside of a/the mold" refers to the inside of a space enclosed by the open mold and the flexible film.

In the RTM method to be employed in the present invention, a reinforcing fiber substrate is impregnated with an epoxy resin composition, and then the epoxy resin composition is thermally cured. The temperature of a mold during thermal curing is usually higher than that during injection of an epoxy resin composition. The temperature of a mold during thermal curing is preferably 80 to 200° C. The length of time for thermal curing is preferably 1 to 20 hours. After the completion of thermal curing, an obtained fiber-reinforced composite material is taken out of the mold. Then, the fiber-reinforced composite material may be post-cured by heating at a higher temperature. Post-curing is preferably performed at 150 to 200° C. for 1 to 4 hours.

In the present invention, a method derived from the RTM method such as a VaRTM (Vacuum-assisted Resin Transfer Molding) method, SCRIMP (Seeman's Composite Resin Infusion Molding Process), or a method disclosed in JP-T-2005-527410 for more properly controlling a resin infusion process, particularly a VaRTM process by evacuating a resin feed tank to a pressure below atmospheric pressure, employing cyclic compaction, and controlling a net compaction pressure can be appropriately employed.

When a fiber-reinforced composite material is produced by such an RTM method as described above, as a reinforcing fiber substrate, the above-described unidirectional fabric is preferably used, and the above-described non-crimp fabric is more preferably used. In a non-crimp fabric, gaps between warps (shown by reference numeral 1 in FIG. 1) each composed of one or more carbon fiber strands and auxiliary warps (shown by reference numeral 2 in FIG. 1) each of which is a glass fiber bundle or a chemical fiber bundle and which are arranged in parallel with the warps function as resin flow channels. Therefore, by using such a non-crimp fabric as a reinforcing fiber substrate, a fiber-reinforced composite material can be efficiently obtained. Further, the epoxy resin composition according to the present invention has low viscosity, which makes it possible to more efficiently obtain a fiber-reinforced composite material. The thus obtained fiber-reinforced composite material has particularly excellent compressive strength, impact resistance, fatigue resistance, and open-hole tensile strength.

Further, when a fiber-reinforced composite material is produced by such a RTM method as described above, impregnation of a reinforcing fiber substrate, which is preferably the above-described unidirectional fabric, more preferably the above-described non-crimp fabric, with the epoxy resin composition according to the present invention is preferably performed by evacuating the inside of a mold with the use of, for example, a vacuum pump. In the case of using a non-crimp fabric, as described above, since gaps between warps (shown by reference numeral 1 in FIG. 1) each composed of one or more carbon fiber strands and auxiliary warps (shown by reference numeral 2 in FIG. 1) each of which is a glass fiber bundle or a chemical fiber bundle and which are arranged in parallel with the warps function as resin flow channels, a large-sized fiber-reinforced composite material can be efficiently obtained by evacuating the inside of a mold. Further, the epoxy resin composition according to the present invention has low viscosity, which makes it possible to more efficiently obtain a large-sized fiber-reinforced composite material. The thus obtained fiber-reinforced composite material has particularly excellent compressive strength, impact resistance, fatigue resistance, and open-hole tensile strength.

The fiber-reinforced composite material according to the present invention has excellent thermal properties, compressive strength, impact resistance, and open-hole tensile strength, and therefore can be preferably used for various structural parts such as aircraft structural parts including main bodies, main wings, tails, rotor blades, fairings, cowls, doors, seats, interior materials, spacecraft structural parts including motor cases and main wings, satellite structural parts including bodies and antennas, vehicle structural parts including exterior panels, chassis, aerodynamic parts, and seats, railway car structural parts including bodies and seats, and ship structural parts including hulls and seats.

EXAMPLES

Hereinbelow, the present invention will be more specifically described with reference to the following examples. Resin raw materials, a method for preparing an epoxy resin composition, a method for producing a cured product, and measurement methods of various properties used in the examples are as follows.

<Resin Raw Materials>

An epoxy resin composition was prepared using the following commercially-available products.

(1) Epoxy Resins (a) Bifunctional Epoxy Resins (Component A)

GAN (N,N-diglycidyl aniline manufactured by Nippon Kayaku Co., Ltd., epoxy equivalent: 125 g/mol)

GOT (N,N-diglycidyl-o-toluidine manufactured by Nippon Kayaku Co., Ltd., epoxy equivalent: 135 g/mol)

"DENACOL™" EX721 (phthalic acid diglycidyl ester manufactured by Nagase Chemtex Corporation, epoxy equivalent: 154 g/mol)

AK601 (hexahydrophthalic acid diglycidyl ester manufactured by Nippon Kayaku Co., Ltd., epoxy equivalent: 154 g/mol)

(b) Tri- or higher-functional Aromatic Epoxy Resins (Component D)

"Araldite™" MY721 (N,N,N',N'-tetraglycidyl-4,4'-diaminodiphenylmethane manufactured by Huntsman Advanced Materials, epoxy equivalent: 113 g/mol)

"jER™" 630 (N,N,O-triglycidyl-p-aminophenol manufactured by Japan Epoxy Resins Co., Ltd., epoxy equivalent: 98 g/mol)

"Araldite™" MY0600 (N,N,O-triglycidyl-m-aminophenol, manufactured by Huntsman Advanced Materials, epoxy equivalent: 106 g/mol)

(c) Other Epoxy Resins

"jER™" 825 (diglycidyl ether of bisphenol A manufactured by Japan Epoxy Resins Co., Ltd., epoxy equivalent: 175 g/mol)

(2) Liquid Aromatic Diamine Curing Agents (a) Liquid Aromatic Diamine Curing Agents (Component B)

"jER Cure™" W (mixture of 2,4-diethyl-6-methyl-1,3-phenylenediamine and 4,6-diethyl-2-methyl-1,3-phenylenediamine manufactured by Japan Epoxy Resins Co., Ltd., active hydrogen equivalent: 45 g/mol)

UOP No. 225 (product number) (4,4'-methylenebis(N-sec-butylaniline) manufactured by Nikki Universal Co., Ltd., active hydrogen equivalent: 155 g/mol)

(b) Other Amine Curing Agents 3,3'-DAS (3,3'-diaminodiphenylsulfone, manufactured by Konishi Chemical Inc Co., Ltd., active hydrogen equivalent: 62 g/mol) (solid aromatic diamine curing agent)

"Seikacure™" S (4,4'-diaminodiphenylmethane, manufactured by Seika Corporation, active hydrogen equivalent: 62 g/mol) (solid aromatic diamine curing agent)

aniline (manufactured by Tokyo Chemical Industry Co., Ltd., active hydrogen equivalent: 46 g/mol) (liquid aromatic monoamine curing agent)

m-xylylene diamine (manufactured by Tokyo Chemical Industry Co., Ltd., active hydrogen equivalent: 34 g/mol) (liquid diamine curing agent which is not aromatic)

(3) Core-Shell Polymer Particles (a) Core-Shell Polymer Particles (Component (C))

"kane Ace™" MX125 (manufactured by Kaneka Corporation as a masterbatch of 75% by mass of diglycidyl ether of bisphenol A and 25% by mass of core-shell polymer particles (volume-average particle size: 100 nm, core: butadiene/styrene copolymer (Tg: −45° C.), shell: methyl methacrylate/glycidyl methacrylate/styrene copolymer))

"kane Ace™" MX125 Large Particle Type (manufactured by Kaneka Corporation as a masterbatch of 75% by mass of diglycidyl ether of bisphenol A and 25% by mass of core-shell polymer particles (volume-average particle size: 250 nm, core: butadiene/styrene copolymer (Tg: −45° C.), shell: methyl methacrylate/glycidyl methacrylate/styrene copolymer))

"Kane Ace™" MX416 (manufactured by kaneka Corporation as a masterbatch of 75% by mass of "Araldite™" MY721 and 25% by mass of core-shell polymer particles (volume-average particle size: 100 nm, core: cross-linked polybutadiene (Tg: −70° C.), shell: methyl methacrylate/glycidyl methacrylate/styrene copolymer))

Core-shell polymer particles A (prepared as a masterbatch of 75% by mass of "Araldite™" MY721 and 25% by mass of core-shell polymer particles (volume-average particle size: 100 nm, core: butadiene/styrene copolymer (Tg: −25° C.), shell: methyl methacrylate/glycidyl methacrylate/styrene copolymer))

Core-shell polymer particles A were synthesized by a method disclosed in JP-A-2005-248109. The ratio between butadiene and styrene was 50:50 (% by mass). After a butadiene/styrene rubber latex was produced, 5% by mass of methyl methacrylate, 5% by mass of glycidyl methacrylate, and 5% by mass of styrene were added to 100% by mass of the butadiene/styrene rubber latex to perform graft polymerization.

(b) Other Core-Shell Polymer Particles

"Paraloid™" EXL-2655 (core-shell polymer particles (volume-average particle size: 100 nm, core: butadiene/styrene copolymer, shell: PMMA/styrene copolymer) manufactured by Kureha Corporation) (core-shell polymer particles containing no epoxy groups in their shell)

"Staphyloid™" AC-3355 (core-shell polymer particles (volume-average particle size: 500 nm, core: cross-linked polybutyl acrylate, shell: cross-linked polystyrene) manufactured by Ganz Chemical Co., Ltd.) (core-shell polymer particles containing no epoxy groups in their shell and having a volume-average particle size outside the range of 50 to 300 nm)

<Preparation of Epoxy Resin Compositions>

Epoxy resin Compositions shown in Table 1 were prepared in the following manner. A predetermined amount of epoxy resin heated to 70° C. was weighed in a 300-mL stainless beaker, and was stirred using a spatula until homogenized. When core-shell polymer particles were used, the core-shell polymer particles were added to the homogenized epoxy resin and stirred using a homogenizer to obtain a base component of an epoxy resin composition. Then, an amine curing agent heated to 70° C. was added to the base component and stirred using a spatula to obtain an epoxy resin composition. It is to be noted that when diaminodiphenylsulfone was used, an amine curing agent was prepared separately from the base component by adding diaminodiphenylsulfone to a liquid aromatic diamine curing agent heated to 150° C. and stirring the mixture using a spatula until the mixture was homogenized.

<Measurement of Initial Viscosity of Epoxy Resin Composition at 70° C.>

The initial viscosity of the epoxy resin composition obtained by the above method at 70° C. was measured according to "viscosity measurement method using cone-plate rotational viscometer" specified in JIS Z8803 (1991) using an E-type viscometer equipped with a standard cone rotor (1° 34'×R24) (TVE-30H manufactured by Toki Sangyo Co., Ltd.) at a rotation speed of 50 rpm. It is to be noted that the initial viscosity was measured after the epoxy resin composition was maintained at 70° C. for 5 minutes after its preparation.

<Measurement of Volume-Average Particle Size of Core-Shell Polymer Particles>

One hundred grams of the base component of the epoxy resin composition obtained by the above method was mixed with 20 g of methyl ethyl ketone to obtain a mixture. The volume-average particles size of the core-shell polymer particles was measured according to JIS Z8826 (2005) using the obtained mixture and a nanotrac particle size analyzer UPA-EX150 (manufactured by NIKKISO Co., Ltd.).

<Method for Producing Epoxy Resin Cured Product>

The epoxy resin composition obtained by the above method was injected into the inside of a mold having a plate-shaped cavity with a thickness of 2 mm and into the inside of a mold having a plate-shaped cavity with a thickness of 6 mm, and was then thermally cured in an oven under the following conditions to obtain cured resin plates.

(1) The temperature in the oven was increased from 30° C. to 180° C. at a rate of 1.5° C./min.

(2) The temperature in the oven was kept at 180° C. for 2 hours.

(3) The temperature in the oven was decreased from 180° C. to 30° C. at a rate of 2.5° C./min.

<Measurement of Glass Transition Temperature (Tg) of Epoxy Resin Cured Product>

Specimens each having a width of 12.7 mm and a length of 55 mm were cut out from the cured resin plate with a thickness of 2 mm obtained by the above method, and their Tg was measured by DMA in accordance with SACMA SRM18R-94 using a rheometer ARES manufactured by Rheometrics Co., Ltd. At this time, a temperature rise rate was 5° C./min and a measuring frequency was 1 Hz. In an obtained temperature-storage elastic modulus G' curve, the temperature value at the intersection between a tangent drawn to a curve in the glass state and a tangent drawn to a curve in the transition state was defined as Tg.

<Measurement of Flexural Modulus of Epoxy Resin Cured Product>

Specimens each having a width of 10 mm and a length of 60 mm were cut out from the cured resin plate with a thickness of 2 mm obtained by the above method, and their flexural modulus was measured by performing a three-point bending test in accordance with JIS K7171-1994 under the conditions of a testing speed of 2.5 mm/min and a support span length of 32 mm. At this time, a measurement temperature was 25° C.

<Measurement of Mode I Fracture Toughness ($G_{IC}$) of Epoxy Resin Cured Product>

The cured resin plate with a thickness of 6 mm obtained by the above method was machined into specimens specified in ASTM D5045-99, and their mode I fracture toughness was measured in accordance with ASTM D5045-99. At this time, measurement temperatures were 25° C. and −54° C.

<Preparation of Reinforcing Fiber Substrate 1 Composed of Carbon Fibers>

A reinforcing fiber substrate 1 composed of carbon fibers used in Example 34 and Comparative Examples 10 and 11 was prepared in the following manner. A unidirectional sheet-like reinforcing fiber bundle group was formed by arranging carbon fiber bundles "Torayca™" T800S-24K-10E (PAN-based non-twisted yarn manufactured by Toray Industries Inc., 24000 filaments) as warps at a density of 1.8 ends/cm. Then, glass fiber bundles ECE225 1/0 1Z (manufactured by Nitto Boseki Co., Ltd., 200 filaments) were arranged as wefts at a density of 3 ends/cm in a direction perpendicular to the unidirectional sheet-like reinforcing fiber bundle group and interlaced with the warps with the use of a weaving machine to prepare a plain-woven fabric in which carbon fibers were arranged in substantially one direction. The thus obtained plain-woven fabric was used as a reinforcing fiber substrate. The weight of carbon fibers per unit area of the reinforcing fiber substrate was 190 g/m². Then, 60 parts by mass of "Sumika Excel™" 5003P (manufactured by Sumitomo Chemical Co., Ltd.), 23.5 parts by mass of "jER™" 806 (glycidyl ether of bisphenol F manufactured by Japan Epoxy Resins Co., Ltd.), 12.5 parts by mass of an epoxy resin having a biphenylaralkyl skeleton (NC-3000 manufactured by Nippon Kayaku Co., Ltd.), and 4 parts by mass of triglycidyl isocyanurate (TEPIC-P manufactured by Nissan Chemical Industries, Ltd.) were melt-kneaded at 210° C. by a twin screw extruder to obtain a resin composition. Then, the resin composition was frozen, pulverized, and classified to obtain binder particles having a volume-average particle size of 100 μm and a glass transition temperature of 73° C. The binder particles were naturally dropped through a vibration net so as to be uniformly dispersed on one of the surfaces of the reinforcing fiber substrate while dispensed using an embossing roller and a doctor blade so that the weight of the binder particles per unit area was 25 g/m². Then, the reinforcing fiber substrate was allowed to pass through a far-infrared heater at 200° C. at 0.3 m/min to fusion-bond the binder particles to the entire one surface of the reinforcing fiber substrate. In this way, a reinforcing fiber substrate 1 having binder particles was obtained.

<Preparation of Reinforcing Fiber Substrate 2 Composed of Carbon Fibers>

A reinforcing fiber substrate 2 composed of carbon fibers used in Examples 35 and 36 was prepared in the following manner. Carbon fiber bundles "Torayca™" T800S-24K-10E (PAN-based non-twisted yarn manufactured by Toray Industries Inc., 24000 filaments) were arranged as warps at a density of 1.8 ends/cm, and glass fiber bundles ECE225 1/0 1Z (manufactured by Nitto Boseki Co., Ltd., 200 filaments) were arranged as auxiliary warps in parallel with the warps at a density of 1.8 ends/cm in such a manner that the warps and the auxiliary warps were alternately arranged to form a unidirectional sheet-like reinforcing fiber bundle group. Then, polyamide fiber bundles (polyamide 66, 7 filaments) were arranged as wefts in a direction perpendicular to the unidirectional sheet-like reinforcing fiber bundle group at a density of 3 ends/cm and interlaced with the auxiliary warps using a weaving machine in such a manner that the auxiliary warps and the wefts were intersected with each other to form a unidirectional non-crimp fabric as shown in FIG. 1. In such a unidirectional non-crimp fabric having no crimps, carbon fiber bundles were arranged in substantially one direction. The weight of carbon fibers per unit area of the reinforcing fiber substrate was 190 g/m². Further, binder particles were fusion-bonded to the entire one surface of the reinforcing fiber substrate in the same manner as in the case of the above-described reinforcing fiber substrate 1 to obtain a reinforcing fiber substrate 2 having binder particles.

<Preparation of Reinforcing Fiber Substrate 3 Composed of Carbon Fibers>

A reinforcing fiber substrate 3 composed of carbon fibers used in Example 37 was prepared in the following manner. A unidirectional non-crimp fabric as shown in FIG. 1 was prepared in the same manner as in the case of the reinforcing fiber substrate 2 except that glass fiber bundles ECE225 1/0 1Z (manufactured by Nitto Boseki Co., Ltd. 200 filaments) were used as wefts. The weight of carbon fibers per unit area of the thus obtained reinforcing fiber substrate was 190 g/m². Further, binder particles were fusion-bonded to the entire one surface of the reinforcing fiber substrate in the same manner as in the case of the above-described reinforcing fiber substrate 1 or 2 to obtain a reinforcing fiber substrate 3 having binder particles.

<Preparation of Fiber-Reinforced Composite Material for Measurement of Glass Transition Temperature (Tg) and 0° Compression Test>

A fiber-reinforced composite material for measurement of Tg and 0° compression test used in Examples 34, 35, and 37 and Comparative Examples 10 and 11 were prepared by RTM in the following manner. Six 395 mm×395 mm pieces were cut out from the above-described reinforcing fiber substrate having binder particles, and were then stacked on top of one another in a mold having a plate-shaped cavity of 400 mm×400 mm×1.14 mm in such a manner that their carbon fibers were unidirectionally oriented to form a preform. At this time, the orientation direction of the carbon fibers was defined as 0° direction. Then, the mold was clamped. Then, the mold was heated to 70° C., and an epoxy resin composition shown in Table 6 previously heated to 70° C. separately from the mold was injected into the inside of the mold at an injection pressure of 0.2 MPa with a resin injector to impregnate the reinforcing fiber substrate with the epoxy resin composition. After the completion of impregnation, the temperature of the mold was increased to 130° at a rate of 1.5° C./min, maintained at 130° C. for 2 hours, and decreased to 30° C., and then an obtained cured product was demolded. The cured product was post-cured in an oven under the following conditions to obtain a fiber-reinforced composite material.

(1) The temperature in the oven was increased from 30° C. to 180° C. at a rate of 1.5° C./min.

(2) The temperature in the oven was maintained at 180° C. for 2 hours.

(3) The temperature in the oven was decreased from 180° C. to 30° C. at a rate of 2.5° C./min.

A reinforcing fiber composite material for measurement of Tg and 0° compression test used in Example 36 was prepared in the same manner as described above except that an epoxy resin composition was injected into the inside of the mold at an injection pressure of 0.2 MPa with the use of a resin injector while the inside of the mold was evacuated using a vacuum pump connected to the mold.

<Preparation of Specimen for Measurement of Tg of Fiber-Reinforce Composite Material>

Rectangular specimens each having a length of 55 mm and a width of 12.7 mm were cut out from the fiber-reinforced composite material obtained by the above method. In this case, a 90° direction was defined as the length direction of the specimen.

<Measurement of Tg of Fiber-Reinforced Composite Material>

The measurement of Tg was performed by DMA in accordance with SACMA SRM18R-94 using the specimen for Tg measurement obtained by the above method and a rheometer ARES manufactured by Rheometrics Co., Ltd. A temperature rise rate was 5° C./min and a measuring frequency was 1 Hz. In an obtained temperature-storage elastic modulus G' curve, the temperature value at the intersection between a tangent drawn to a curve in the glass state and a tangent drawn to a curve in the transition state was defined as Tg.

<Preparation of Specimen for 0° Compression Test of Fiber-Reinforced Composite Material>

Tabs were bonded to the fiber-reinforced composite material obtained by the above method in accordance with SACMA-SRM 1R-94, and rectangular specimens each having a length of 80.0 mm and a width of 15.0 mm were cut out from the fiber-reinforced composite material. In this case, the 0° direction was defined as the length direction of the specimen.

<0° Compression Test of Fiber-Reinforced Composite Material>

A compression test was performed in accordance with SACMA SRM 1R-94 using the specimen for 0° compression test obtained by the above method at 23° C. and a testing rate of 1.0 mm/min. The number of samples was 5, and their average measured value was determined.

<Preparation of Fiber-Reinforced Composite Material for Open-Hole Tensile Test>

A fiber-reinforced composite material for open-hole tensile test used in the Examples 34, 35, and 37 and Comparative Examples 10 and 11 was prepared by RTM in the following manner. Eight pieces of 395 mm×395 mm were cut out from the above-described reinforcing fiber substrate having binder particles, and were then stacked on top of one another in a mold having a plate-shaped cavity of 400 mm×400 mm×1.52 mm to obtain a laminate having a stacking sequence of +45°/0°/−45°/90°/90°/−45°/0°/+45°. In this case, the orientation direction of carbon fibers was defined as 0° direction. In this way, a preform was formed. Then, a mold was clamped. Then, the mold was heated to 70° C., and an epoxy resin composition shown in Table 6 previously heated to 70° C. separately from the mold was injected into the inside of the mold at an injection pressure of 0.2 MPa with the use of a resin injector to impregnate the reinforcing fiber substrate with the epoxy resin composition. After the completion of impregnation, the temperature of the mold was increased to 130° at a rate of 1.5° C./min, maintained at 130° C. for 2 hours, and decreased to 30° C., and then an obtained cured product was demolded. The cured product was post-cured in an oven under the following conditions to obtain a fiber-reinforced composite material.

(1) The temperature in the oven was increased from 30° C. to 180° C. at a rate of 1.5° C./min.

(2) The temperature in the oven was maintained at 180° C. for 2 hours.

(3) The temperature in the oven was decreased from 180° C. to 30° C. at a rate of 2.5° C./min.

A fiber-reinforced composite material for open-hole tensile test used in Example 36 was prepared in the same manner as described above except that an epoxy resin composition was injected into the inside of the mold at an injection pressure of 0.2 MPa with the use of a resin injector while the inside of the mold was evacuated using a vacuum pump connected to the mold.

<Preparation of Specimen for Open-Hole Tensile Test of Fiber-Reinforced Composite Material>

Rectangular specimens each having a length of 300 mm and a width of 36.0 mm were cut out from the fiber-reinforced composite material obtained by the above method, and then a hole having a diameter of 6.0 mm was formed in the specimen using a drill and a reamer in accordance with ASTM D5766-95. In this case, the 0° direction was defined as the length direction of the specimen.

<Open-Hole Tensile Test of Fiber-Reinforced Composite Material>

An open-hole tensile test was performed in accordance with ASTM D5766-95 using the specimen for open-hole tensile test obtained by the above method at 23° C. and a testing rate of 1.27 mm/min. The number of samples was 5, and their average measured value was determined.

Examples 1 to 9

Epoxy resin compositions were prepared using the resin raw materials shown in Table 1, and the initial viscosity of each of the epoxy resin compositions at 70° C. was measured. As a result, all the epoxy resin compositions had sufficiently low viscosity. Then, the epoxy resin compositions were cured to obtain cured products, and the Tg, flexural modulus, and mode I fracture toughness of each of the cured products were measured. As a result, all the cured products had high Tg, high elastic modulus, and high toughness. From the result, it was found that all the cured products of Examples 1 to 9 were excellent. Among them, the cured products of Examples 2, 3, 5, 6, and 8 had very high Tg, very high elastic modulus, and very high toughness. From the result, it was found that the cured products of Examples 2, 3, 5, 6, and 8 were particularly excellent.

TABLE 1

Unit of resin raw material content: part(s) by mass

| | | Example 1 | Example 2 | Example 3 | Example 4 | Example 5 | Example 6 | Example 7 | Example 8 | Example 9 |
|---|---|---|---|---|---|---|---|---|---|---|
| Component (A) | GAN (manufactured by Nippon Kayaku Co., Ltd.) N,N-diglycidyl aniline | 30 | 30 | 30 | 30 | 30 | 30 | 10 | 50 | 70 |
| | GOT (manufactured by Nippon Kayaku Co., Ltd.) N,N-diglycidyl-o-toluidine | — | — | — | — | — | — | — | — | — |

TABLE 1-continued

Unit of resin raw material content: part(s) by mass

|  |  | Example 1 | Example 2 | Example 3 | Example 4 | Example 5 | Example 6 | Example 7 | Example 8 | Example 9 |
|---|---|---|---|---|---|---|---|---|---|---|
|  | "DENACOL ™" EX721 (manufactured by Nagase Chemtex Corporation) Phthalic acid diglycidyl ester | — | — | — | — | — | — | — | — | — |
|  | AK601 (manufactured by Nippon Kayaku Co., Ltd.) Hexahydrophthalic acid diglycidyl ester | — | — | — | — | — | — | — | — | — |
| Other Epoxy Resins | "jER" 825 (manufactured by Japan Epoxy Resins Co., Ltd.) Diglycidyl ether of bisphenol A | 64 | 55 | 40 | 25 | 55 | 40 | 75 | 35 | 15 |
| Component (B) | "jER Cure" W (manufactured by Japan Epoxy Resins Co., Ltd.) Mixture of 2,4-diethyl-6-methyl-1,3-phenylene diamine and 4,6-diethyl-2-methyl-1,3-phenylene diamine | 28.7 | 28.6 | 28.4 | 28.2 | 28.6 | 28.4 | 26.5 | 30.7 | 32.7 |
| Component (C) | "kane Ace" MX125 (manufactured by Kaneka Corporation) Modified with epoxy groups, Volume-average particle size: 100 nm Value within [ ]: Core-shell polymer particle content | 8 [2] | 20 [5] | 40 [10] | 60 [15] | — | — | 20 [5] | 20 [5] | 20 [5] |
|  | "kane Ace" MX125 Large Particle Type (manufactured by Kaneka Corporation) Modified with epoxy groups, Volume-average particle size: 250 nm Value within [ ]: Core-shell polymer particle content | — | — | — | — | 20 [5] | 40 [10] | — | — | — |
| Resin Properties | Initial viscosity at 70° C. [mPa · s] | 42 | 48 | 61 | 76 | 46 | 57 | 60 | 41 | 36 |
|  | Tg [° C.] | 170 | 170 | 169 | 167 | 170 | 168 | 183 | 154 | 139 |
|  | Flexural modulus [° C.] | 3.4 | 3.3 | 3.1 | 2.9 | 3.3 | 3.1 | 2.4 | 3.7 | 4.0 |
|  | Mode I fracture toughness (25° C.) [J/m$^2$] | 166 | 242 | 265 | 267 | 203 | 224 | 219 | 263 | 281 |
|  | Mode I fracture toughness (−54° C.) [J/m$^2$] | 192 | 265 | 286 | 283 | 216 | 235 | 240 | 287 | 295 |

Examples 10 and 11

Epoxy resin compositions were prepared using the resin raw materials shown in Table 2, and the initial viscosity of each of the epoxy resin compositions at 70° C. was measured. As a result, both the epoxy resin compositions had sufficiently low viscosity. Then, the epoxy resin compositions were cured to obtain cured products, and the Tg, flexural modulus, and mode I fracture toughness of each of the cured products were measured. As a result, both the cured products had high Tg, high elastic modulus, and high toughness. From the result, it was found that the cured products of Examples 10 and 11 were excellent. However, the epoxy resin compositions of Examples 1 and 2 had lower viscosity as compared to the epoxy resin compositions of Examples 10 and 11, and the cured products of Examples 1 and 2 had higher Tg as compared to the cured products of Examples 10 and 11. From the result, it was found that the cured products of Examples 1 and 2 were more excellent as compared to the cured products of Examples 10 and 11.

Examples 12 to 20

Epoxy resin compositions were prepared using the resin raw materials shown in Tables 2 and 3, and the initial viscosity of each of the epoxy resin compositions at 70° C. was measured. As a result, all the epoxy resin compositions had sufficiently low viscosity. Then, the epoxy resin compositions were cured to obtain cured products, and the Tg, flexural modulus, and mode I fracture toughness of each of the cured products were measured. As a result, all the cured products had high Tg, high elastic modulus, and high toughness. From the result, it was found that all the cured products of Examples 12 to 20 were excellent. Among them, the cured products of Examples 13, 14, 16, 17, 19, and 20 had very high Tg, very high elastic modulus, and very high toughness. From the result, it was found that the cured products of Examples 13, 14, 16, 17, 19, and 20 were particularly excellent.

Examples 21 to 24

Epoxy resin compositions were prepared using the resin raw materials shown in Table 3, and the initial viscosity of each of the epoxy resin compositions at 70° C. was measured. As a result, all the epoxy resin compositions had sufficiently low viscosity. Then, the epoxy resin compositions were cured to obtain cured products, and the Tg, flexural modulus, and mode I fracture toughness of each of the cured products were measured. As a result, all the cured products had high Tg, high elastic modulus, and high toughness. From the result, it was found that all the cured products of Examples 21 to 24 were excellent. Among them, the cured products of Examples 22 and 23 had very high Tg, very high elastic modulus, and very high toughness. From the result, it was found that the cured products of Examples 22 and 23 were particularly excellent.

TABLE 2

Unit of resin raw material content: part(s) by mass

| | | Example 10 | Example 11 | Example 12 | Example 13 | Example 14 | Example 15 | Example 16 | Example 17 |
|---|---|---|---|---|---|---|---|---|---|
| Component (A) | GAN (manufactured by Nippon Kayaku Co., Ltd.) N,N-diglycidyl aniline | 30 | 30 | — | — | — | — | — | — |
| | GOT (manufactured by Nippon Kayaku Co., Ltd.) N,N-diglycidyl-o-toluidine | — | — | 10 | 30 | 50 | — | — | — |
| | "DENACOL ™" EX721 (manufactured by Nagase Chemtex Corporation) Phthalic acid diglycidyl ester | — | — | — | — | — | 10 | 30 | 50 |
| | AK601 (manufactured by Nippon Kayaku Co., Ltd.) Hexahydrophthalic acid diglycidyl ester | — | — | — | — | — | — | — | — |
| Other Epoxy Resins | "jER" 825 (manufactured by Japan Epoxy Resins Co., Ltd.) Diglycidyl ether of bisphenol A | 64 | 55 | 75 | 55 | 35 | 75 | 55 | 35 |
| Component (B) | "jER Cure" W (manufactured by Japan Epoxy Resins Co., Ltd.) Mixture of 2,4-diethyl-6-methyl-1,3-phenylenediamine and 4,6-diethyl-2-methyl-1,3-phenylenediamine | — | — | 26.3 | 27.8 | 29.3 | 25.9 | 26.6 | 27.3 |
| | UOP No. 225 (manufactured by Nikki Universal Co., Ltd.) 4,4'-methylenebis(N-sec-butylaniline) | 98.9 | 98.9 | — | — | — | — | — | — |
| Component (C) | "kane Ace" MX125 (manufactured by Kaneka Corporation) Modified with epoxy groups, Volume-average particle size: 100 nm Value within [ ]: Core-shell polymer particle content | 8 [2] | 20 [5] | 20 [5] | 20 [5] | 20 [5] | 20 [5] | 20 [5] | 20 [5] |
| Resin Properties | Initial viscosity at 70° C. [mPa · s] | 51 | 58 | 58 | 45 | 35 | 78 | 62 | 59 |
| | Tg [° C.] | 166 | 165 | 183 | 166 | 151 | 186 | 178 | 166 |
| | Flexural modulus [° C.] | 3.3 | 3.2 | 2.4 | 3.2 | 3.5 | 2.3 | 3.1 | 3.5 |
| | Mode I fracture toughness (25° C.) [J/m$^2$] | 169 | 252 | 223 | 241 | 258 | 230 | 252 | 277 |
| | Mode I fracture toughness (−54° C.) [J/m$^2$] | 193 | 269 | 240 | 263 | 271 | 252 | 269 | 291 |

TABLE 3

Unit of resin raw material content: part(s) by mass

| | | Example 18 | Example 19 | Example 20 | Example 21 | Example 22 | Example 23 | Example 24 |
|---|---|---|---|---|---|---|---|---|
| Component (A) | GAN (manufactured by Nippon Kayaku Co., Ltd.) N,N-diglycidyl aniline | — | — | — | 30 | 30 | 30 | 20 |
| | GOT (manufactured by Nippon Kayaku Co., Ltd.) N,N-diglycidyl-o-toluidine | — | — | — | — | — | — | — |
| | "DENACOL ™" EX721 (manufactured by Nagase Chemtex Corporation) Phthalic acid diglycidyl ester | — | — | — | — | — | — | — |
| | AK601 (manufactured by Nippon Kayaku Co., Ltd.) Hexahydrophthalic acid diglycidyl ester | 10 | 30 | 50 | — | — | — | — |
| Component (D) | "Araldite" MY721 (manufactured by Huntsman Advanced Materials) N,N,N',N'-tetraglycidyl-4,4'-diaminodiphenylmethane | — | — | — | 5 | 25 | 45 | 65 |
| Other Epoxy Resins | "jER" 825 (manufactured by Japan Epoxy Resins Co., Ltd.) Diglycidyl ether of bisphenol A | 75 | 55 | 35 | 50 | 30 | 10 | 10 |
| Component (B) | "jER Cure" W (manufactured by Japan Epoxy Resins Co., Ltd.) Mixture of 2,4-diethyl-6-methyl-1,3-phenylenediamine and 4,6-diethyl-2-methyl-1,3-phenylenediamine | 25.9 | 26.6 | 27.3 | 31.7 | 34.6 | 37.4 | 39.2 |
| Component (C) | "kane Ace" MX125 (manufactured by Kaneka Corporation) Modified with epoxy groups, Volume-average particle size: 100 nm Value within [ ]: Core-shell polymer particle content | 20 [5] | 20 [5] | 20 [5] | — | — | — | — |
| | "kane Ace" MX416 (manufactured by Kaneka Corporation) Modified with epoxy groups, Volume-average particle size: 100 nm Value within [ ]: Core-shell polymer particle content | — | — | — | 20 [5] | 20 [5] | 20 [5] | 20 [5] |

TABLE 3-continued

Unit of resin raw material content: part(s) by mass

|  |  | Example 18 | Example 19 | Example 20 | Example 21 | Example 22 | Example 23 | Example 24 |
|---|---|---|---|---|---|---|---|---|
| Resin Properties | Initial viscosity at 70° C. [mPa · s] | 64 | 58 | 53 | 68 | 89 | 110 | 143 |
|  | Tg [° C.] | 184 | 175 | 162 | 173 | 178 | 182 | 192 |
|  | Flexural modulus [° C.] | 2.3 | 3.0 | 3.4 | 3.2 | 3.6 | 3.8 | 3.4 |
|  | Mode I fracture toughness (25° C.) [J/m$^2$] | 225 | 248 | 276 | 231 | 222 | 214 | 185 |
|  | Mode I fracture toughness (−54° C.) [J/m$^2$] | 252 | 273 | 290 | 256 | 249 | 243 | 216 |

Examples 25 to 30

Epoxy resin compositions were prepared using the resin raw materials shown in Table 4, and the initial viscosity of each of the epoxy resin compositions at 70° C. was measured. As a result, all the epoxy resin compositions had sufficiently low viscosity. Then, the epoxy resin compositions were cured to obtain cured products, and the Tg, flexural modulus, and mode I fracture toughness of each of the cured products were measured. As a result, all the cured products had high Tg, high elastic modulus, and high toughness. From the result, it was found that the cured products of Examples 25 to 30 were particularly excellent in Tg and elastic modulus as compared to the cured product of Example 2. Among them, the epoxy resin compositions of Examples 26, 27, 29, and 30 had low viscosity and the cured products of Examples 26, 27, 29, and 30 had very high Tg, very high elastic modulus, and very high toughness. From the result, it was found that the cured products of Examples 26, 27, 29, and 30 were particularly excellent.

Examples 31 and 32

Epoxy resin compositions were prepared using the resin raw materials shown in Table 4, and the initial viscosity of each of the epoxy resin compositions at 70° C. was measured. As a result, both the epoxy resin compositions had relatively-low viscosity. Then, the epoxy resin compositions were cured to obtain cured products, and the Tg, flexural modulus, and mode I fracture toughness of each of the cured products were measured. As a result, both the cured products had high Tg, high elastic modulus, and high toughness. From the result, it was found that the cured products of Examples 31 and 32 were particularly excellent in Tg, elastic modulus, and fracture toughness as compared to the cured product of Example 26.

Example 33

An epoxy resin composition was prepared using the resin raw materials shown in Table 4, and the initial viscosity of the epoxy resin composition at 70° C. was measured. As a result, the epoxy resin composition had sufficiently low viscosity. Then, the epoxy resin composition was cured to obtain a cured product, and the Tg, flexural modulus, and mode I fracture toughness of the cured product were measured. As a result, the cured product had high Tg, high elastic modulus, and high toughness at 25° C., but its toughness at −56° C. was slightly lower than that of Example 26.

TABLE 4

Unit of resin raw material content: part(s) by mass

|  |  | Example 25 | Example 26 | Example 27 | Example 28 | Example 29 | Example 30 | Example 31 | Example 32 | Example 33 |
|---|---|---|---|---|---|---|---|---|---|---|
| Component (A) | GAN (manufactured by Nippon Kayaku Co., Ltd.) N,N-diglycidyl aniline | 30 | 30 | 30 | 30 | 30 | 30 | 30 | 30 | 30 |
| Component (D) | "jER" 630 (manufactured by Japan Epoxy Resins Co., Ltd.) N,N,O-triglycidyl-p-aminophenol | 5 | 25 | 45 | — | — | — | 25 | 25 | 25 |
|  | "Araldite" MY0600 (manufactured by Huntsman Advanced Materials) N,N,O-triglycidyl-m-aminophenol, | — | — | — | 5 | 25 | 45 | — | — | — |
| Other Epoxy Resins | "jER" 825 (manufactured by Japan Epoxy Resins Co., Ltd.) Diglycidyl ether of bisphenol A | 50 | 30 | 10 | 50 | 30 | 10 | 30 | 30 | 30 |
| Component (B) | "jER Cure" W (manufactured by Japan Epoxy Resins Co., Ltd.) Mixture of 2,4-diethyl-6-methyl-1,3-phenylene diamine and 4,6-diethyl-2-methyl-1,3-phenylene diamine | 32.0 | 36.1 | 40.1 | 31.9 | 35.2 | 38.6 | 28.2 | 21.4 | 36.1 |
| Other amine curing agent | 3,3'-DAS (manufactured by Konishi Chemical Inc Co., Ltd.) 3,3'-diaminodiphenylsulfone | — | — | — | — | — | — | 6.0 | 10.7 | — |
|  | "Seikacure" S (manufactured by Seika Corporation) 4,4'-diaminodiphenylsulfone | — | — | — | — | — | — | 6.0 | 10.7 | — |

TABLE 4-continued

Unit of resin raw material content: part(s) by mass

| | | Example 25 | Example 26 | Example 27 | Example 28 | Example 29 | Example 30 | Example 31 | Example 32 | Example 33 |
|---|---|---|---|---|---|---|---|---|---|---|
| Component (C) | "kane Ace" MX416 (manufactured by Kaneka Corporation) Modified with epoxy groups, Volume-average particle size: 100 nm Value within [ ]: Core-shell polymer particle content | 20 [5] | 20 [5] | 20 [5] | 20 [5] | 20 [5] | 20 [5] | 20 [5] | 20 [5] | — |
| | Core-shell polymer A Modified with epoxy groups, Volume-average particle size: 100 nm Value within [ ]: Core-shell polymer particle content | — | — | — | — | — | — | — | — | 20 [5] |
| Resin Properties | Initial viscosity at 70° C. [mPa·s] | 45 | 39 | 32 | 59 | 69 | 74 | 77 | 180 | 40 |
| | Tg [° C.] | 172 | 177 | 179 | 170 | 174 | 176 | 180 | 183 | 175 |
| | Flexural modulus [° C.] | 3.2 | 3.5 | 3.6 | 3.2 | 3.6 | 3.8 | 3.6 | 3.7 | 3.5 |
| | Mode I fracture toughness (25° C.) [J/m$^2$] | 221 | 209 | 202 | 219 | 205 | 196 | 217 | 220 | 204 |
| | Mode I fracture toughness (−54° C.) [J/m$^2$] | 246 | 241 | 220 | 245 | 232 | 219 | 243 | 245 | 189 |

Comparative Example 1

An epoxy resin composition was prepared using the resin raw materials shown in Table 5, and the initial viscosity of the epoxy resin composition at 70° C. was measured. As a result, the epoxy resin composition had sufficiently low viscosity. Then, the epoxy resin composition was cured to obtain a cured product, and the Tg, flexural modulus, and mode I fracture toughness of the cured product were measured. As a result, the cured product had significantly low toughness. From the result, it was found that the cured product of Comparative Example 1 was poor in toughness.

Comparative Examples 2 to 5

Epoxy resin compositions were prepared using the resin raw materials shown in Table 5, and the initial viscosity of each of the epoxy resin compositions at 70° C. was measured. As a result, all the epoxy resin compositions had sufficiently low viscosity. Then, the epoxy resin compositions were cured to obtain cured products, and the Tg, flexural modulus, and mode I fracture toughness of each of the cured products were measured. As a result, these cured products had low toughness. From the result, it was found that the cured products of Comparative Examples 2 to 5 were poor in toughness. Thin sections of the cured products were cut by a microtome and were observed using a transmission microscope. As a result, many aggregates of core-shell polymer particles were observed in the thin sections.

Comparative Example 6

An epoxy resin composition was prepared using the resin raw materials shown in Table 5, and the initial viscosity of the epoxy resin composition at 70° C. was measured. As a result, the epoxy resin composition had sufficiently low viscosity. Then, the epoxy resin composition was cured to obtain a cured product, and the Tg, flexural modulus, and mode I fracture toughness of the cured product were measured. As a result, the cured product had significantly low elastic modulus. From the result, it was found that the cured product of Comparative Example 6 was poor in elastic modulus.

Comparative Example 7

An epoxy resin composition was prepared using the resin raw materials shown in Table 5. However, the viscosity of the epoxy resin composition could not be measured because its curing agent remained as crystals. If this epoxy resin composition is used in RTM, there is a fear that the crystals of the curing agent cannot pass through the gaps between carbon fibers and therefore part of the epoxy resin composition is poorly cured.

Comparative Example 8

An epoxy resin composition was prepared using the resin raw materials shown in Table 5, and the initial viscosity of the epoxy resin composition at 70° C. was measured. As a result, the epoxy resin composition had sufficiently low viscosity. Then, the epoxy resin composition was cured to obtain a cured product, and the Tg, flexural modulus, and mode I fracture toughness of the cured product were measured. As a result, the cured product had low Tg. From the result, it was found that the cured product of Comparative Example 8 was poor in Tg.

Comparative Example 9

An epoxy resin composition was prepared using the resin raw materials shown in Table 5, and the initial viscosity of the epoxy resin composition at 70° C. was measured. As a result, the epoxy resin composition had sufficiently low viscosity. Then, the epoxy resin composition was cured to obtain a cured product, and the Tg, flexural modulus, and mode I fracture toughness of the cured product were measured. As a result, the cured product had low Tg. From the result, it was found that the cured product of Comparative Example 9 was poor in Tg.

TABLE 5

| | | Unit of resin raw material content: part(s) by mass | | | | |
|---|---|---|---|---|---|---|
| | | Comparative example 1 | Comparative example 2 | Comparative example 3 | Comparative example 4 | Comparative example 5 |
| Component (A) | GAN (manufactured by Nippon Kayaku Co., Ltd.) N,N-diglycidyl aniline | 30 | 30 | 30 | 30 | 30 |
| Other Epoxy Resins | "jER" 825 (manufactured by Japan Epoxy Resins Co., Ltd.) Diglycidyl ether of bisphenol A | 70 | 70 | 70 | 70 | 70 |
| Component (B) | "jER Cure" W (manufactured by Japan Epoxy Resins Co., Ltd.) Mixture of 2,4-diethyl-6-methyl-1,3-phenylenediamine and 4,6-diethyl-2-methyl-1,3-phenylenediamine | 28.8 | 28.8 | 28.8 | 28.8 | 28.8 |
| Other amine curing agent | "Seikacure" S (manufactured by Seika Corporation) 4,4'-diaminodiphenylsulfone | — | — | — | — | — |
| | aniline (manufactured by Tokyo Chemical Industry Co., Ltd.) | — | — | — | — | — |
| | m-xylylene diamine (manufactured by Tokyo Chemical Industry Co., Ltd.) | — | — | — | — | — |
| Component (C) | "kane Ace" MX125 (manufactured by Kaneka Corporation) Modified with epoxy groups, Volume-average particle size: 100 nm Value within [ ]: Core-shell polymer particle content | — | — | — | — | — |
| Other Core-shell polymer particle content | "Paraloid" EXL-2655 (manufactured by Kureha Corporation) Unmodified with epoxy groups, Volume-average particle size: 100 nm Value within [ ]: Core-shell polymer particle content | — | 5 [5] | 10 [10] | — | — |
| | "Staphyloid" AC-3355 (manufactured by Takeda Pharmaceutical Co., Ltd.) Unmodified with epoxy groups, Volume-average particle size: 500 nm Value within [ ]: Core-shell polymer particle content | — | — | — | 5 [5] | 10 [10] |
| Resin Properties | Initial viscosity at 70° C. [mPa · s] | 40 | 49 | 58 | 46 | 57 |
| | Tg [° C.] | 171 | 170 | 169 | 170 | 168 |
| | Flexural modulus [° C.] | 3.5 | 3.2 | 3.0 | 3.3 | 3.0 |
| | Mode I fracture toughness (25° C.) [J/m$^2$] | 46 | 136 | 142 | 115 | 144 |
| | Mode I fracture toughness (−54° C.) [J/m$^2$] | 69 | 97 | 104 | 93 | 105 |

| | | Comparative example 6 | Comparative example 7 | Comparative example 8 | Comparative example 9 |
|---|---|---|---|---|---|
| Component (A) | GAN (manufactured by Nippon Kayaku Co., Ltd.) N,N-diglycidyl aniline | — | 30 | 30 | 30 |
| Other Epoxy Resins | "jER" 825 (manufactured by Japan Epoxy Resins Co., Ltd.) Diglycidyl ether of bisphenol A | 85 | 55 | 55 | 55 |
| Component (B) | "jER Cure" W (manufactured by Japan Epoxy Resins Co., Ltd.) Mixture of 2,4-diethyl-6-methyl-1,3-phenylenediamine and 4,6-diethyl-2-methyl-1,3-phenylenediamine | 25.5 | — | — | — |
| Other amine curing agent | "Seikacure" S (manufactured by Seika Corporation) 4,4'-diaminodiphenylsulfone | — | 39.4 | — | — |
| | aniline (manufactured by Tokyo Chemical Industry Co., Ltd.) | — | — | 29.6 | — |
| | m-xylylene diamine (manufactured by Tokyo Chemical Industry Co., Ltd.) | — | — | — | 21.6 |
| Component (C) | "kane Ace" MX125 (manufactured by Kaneka Corporation) Modified with epoxy groups, Volume-average particle size: 100 nm Value within [ ]: Core-shell polymer particle content | 20 [5] | 20 [5] | 20 [5] | 20 [5] |

TABLE 5-continued

Unit of resin raw material content: part(s) by mass

| | | | | | |
|---|---|---|---|---|---|
| Other Core-shell polymer particle content | "Paraloid" EXL-2655 (manufactured by Kureha Corporation) Unmodified with epoxy groups, Volume-average particle size: 100 nm Value within [ ]: Core-shell polymer particle content | — | — | — | — |
| | "Staphyloid" AC-3355 (manufactured by Takeda Pharmaceutical Co., Ltd.) Unmodified with epoxy groups, Volume-average particle size: 500 nm Value within [ ]: Core-shell polymer particle content | — | — | — | — |
| Resin Properties | Initial viscosity at 70° C. [mPa · s] | 68 | not measured | 27 | 43 |
| | Tg [° C.] | 194 | 167 | 40 | 151 |
| | Flexural modulus [° C.] | 2.2 | 3.4 | 3.8 | 3.2 |
| | Mode I fracture toughness (25° C.) [J/m$^2$] | 207 | 220 | 143 | 148 |
| | Mode I fracture toughness (−54° C.) [J/m$^2$] | 228 | 249 | 167 | 174 |

Example 34

A fiber-reinforced composite material was produced by RTM using the epoxy resin composition of Example 22 and the reinforcing fiber substrate 1 having binder particles. As a result, a high-quality molded product whose carbon fiber volume content was 56% was obtained. The Tg, 0° compressive strength, and open-hole tensile strength of the fiber-reinforced composite material were measured and found to be excellent.

Example 35

A fiber-reinforced composite material was produced by RTM using the epoxy resin composition of Example 22 and the reinforcing fiber substrate 2 having binder particles. As a result, a high-quality molded product whose carbon fiber volume content was 56% was obtained. The Tg, 0° compressive strength, and open-hole tensile strength of the fiber-reinforced composite material were measured and found to be excellent. Particularly, the 0° compressive strength of the fiber-reinforced composite material was very high. From the result, it was found that the fiber-reinforced composite material of Example 35 was particularly excellent in 0° compressive strength.

Example 36

A fiber-reinforced composite material was produced by RTM using the epoxy resin composition of Example 22 and the reinforcing fiber substrate 2 having binder particles while the inside of a mold was evacuated by a vacuum pump connected to the mold. As a result, a high-quality molded product whose carbon fiber volume content was 56% was obtained. In Example 35, the length of time required to inject the epoxy resin composition into the mold and impregnate the reinforcing fiber substrate with the epoxy resin composition was 11 minutes, but in Example 36, it was reduced to 7 minutes. The Tg, 0° compressive strength, and open-hole tensile strength of the fiber-reinforced composite material were measured and found to be excellent. Particularly, the 0° compressive strength of the fiber-reinforced composite material was very high. From the result, it was found that the fiber-reinforced composite material of Example 36 was particularly excellent in 0° compressive strength.

Example 37

A fiber-reinforced composite material was produced by RTM using the epoxy resin composition of Example 22 and the reinforcing fiber substrate 3 having binder particles. As a result, a high-quality molded product whose carbon fiber volume content was 56% was obtained. The Tg, 0° compressive strength, and open-hole tensile strength of the fiber-reinforced composite material were measured and found to be excellent. Particularly, the 0° compressive strength of the fiber-reinforced composite material was very high. From the result, it was found that the fiber-reinforced composite material of Example 37 was particularly excellent in 0° compressive strength.

Comparative Example 10

A fiber-reinforced composite material was produced by RTM using the epoxy resin composition of Comparative Example 1 and the reinforcing fiber substrate 1 having binder particles. As a result, a high-quality molded product whose carbon fiber volume content was 56% was obtained. The Tg, 0° compressive strength, and open-hole tensile strength of the fiber-reinforced composite material were measured, and as a result, the open-hole tensile strength was significantly low. From the result, it was found that the fiber-reinforced composite material of Comparative Example 10 was excellent in Tg and 0° compressive strength but poor in open-hole tensile strength.

Comparative Example 11

A fiber-reinforced composite material was produced by RTM using the epoxy resin composition of Comparative Example 6 and the reinforcing fiber substrate 1 having binder particles. As a result, a high-quality molded product whose carbon fiber volume content was 56% was obtained. The Tg, 0° compressive strength, and open-hole tensile strength of the fiber-reinforced composite material were measured, and as a result, the 0° compressive strength was significantly low. From the result, it was found that the fiber-reinforced composite material of Comparative Example 11 was excellent in Tg and open-hole tensile strength but poor in 0° compressive strength.

TABLE 6

Unit of resin raw material content: part(s) by mass

| | | | Example 34 | Example 35 | Example 36 | Example 37 | Comparative example 10 | Comparative example 11 |
|---|---|---|---|---|---|---|---|---|
| Epoxy resin compositions | Component (A) | GAN (manufactured by Nippon Kayaku Co., Ltd.) N,N-diglycidyl aniline | 30 | 30 | 30 | 30 | 30 | 85 |
| | Component (C) | "Araldite" MY721 (manufactured by Huntsman Advanced Materials) N,N,N',N'-tetraglycidyl-4,4'-diaminodiphenyl-methane | 25 | 25 | 25 | 25 | — | — |
| | Other Epoxy Resins | "jER" 825 (manufactured by Japan Epoxy Resins Co., Ltd.) Diglycidyl ether of bisphenol A | 30 | 30 | 30 | 30 | 70 | — |
| | Component (B) | "jER Cure" W (manufactured by Japan Epoxy Resins Co., Ltd.) Mixture of 2,4-diethyl-6-methyl-1,3-phenylenediamine and 4,6-diethyl-2-methyl-1,3-phenylenediamine | 34.6 | 34.6 | 34.6 | 34.6 | 28.8 | 25.5 |
| | Component (C) | "kane Ace" MX125 (manufactured by Kaneka Corporation) Modified with epoxy groups, Volume-average particle size: 100 nm Value within [ ]: Core-shell polymer particle content | — | — | — | — | — | 20 [5] |
| | | "kane Ace" MX416 (manufactured by Kaneka Corporation) Modified with epoxy groups, Volume-average particle size: 100 nm Value within [ ]: Core-shell polymer particle content | 20 [5] | 20 [5] | 20 [5] | 20 [5] | — | — |
| Reinforcing fiber substrate | | | Substrate 1 | Substrate 2 | Substrate 2 | Substrate 3 | Substrate 1 | Substrate 1 |
| Molding method | | | Not evacuated | Not evacuated | Evacuated | Not evacuated | Not evacuated | Not evacuated |
| Properties of fiber-reinforced composite material | | Carbon fiber volume content [%] | 56 | 56 | 56 | 56 | 56 | 56 |
| | | Tg [° C.] | 180 | 181 | 181 | 182 | 172 | 194 |
| | | 0° compressive strength [MPa] | 1330 | 1460 | 1490 | 1450 | 1260 | 890 |
| | | Open-hole tensile strength [MPa] | 535 | 542 | 545 | 544 | 508 | 530 |

What is claimed is:

1. A method for producing fiber-reinforced composite material, comprising:
   placing a fiber substrate composed of reinforcing fibers on a substrate; attaching a binder to the fiber substrate; mixing at least (i) an epoxy resin base composition and (ii) at least one liquid diamine curing agent to form an epoxy resin composition; impregnating the fiber substrate and binder with the epoxy resin composition; and thermally curing the epoxy resin composition;
   wherein the epoxy resin composition comprises at least the following components (A), (B), and (C);
   wherein:
   (A) is an epoxy resin base composition comprising at least one bifunctional epoxy resin represented by any one of the following formulas (I), (II), and (III):

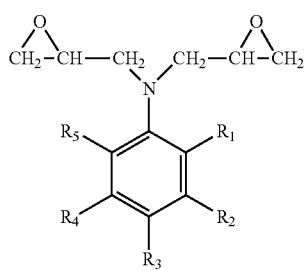

(I)

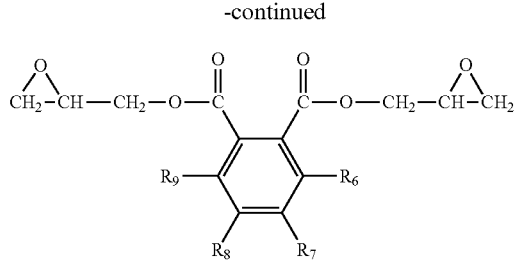

(II)

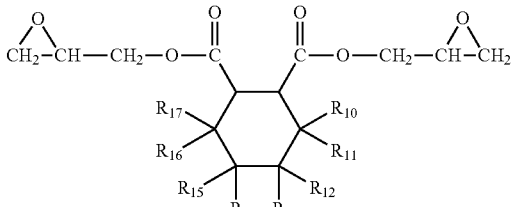

(III)

wherein $R_1$ to $R_{17}$ are each independently a substituent selected from among hydrogen, halogens, and $C_1$ to $C_4$ alkyl groups;

(B) is at least one liquid aromatic diamine curing agent represented by any one or more of the following formulas (IV) to (VI):

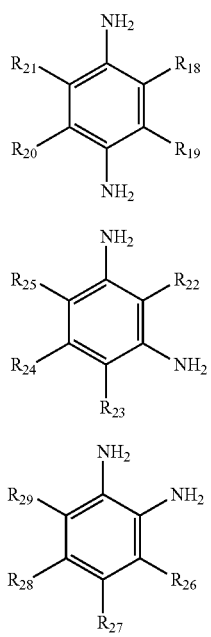

wherein $R_{18}$ to $R_{29}$ are each independently a substituent selected from among hydrogen, halogens, and $C_1$ to $C_4$ alkyl groups;

(C) comprises core-shell polymer particles, wherein the core-shell polymer particles as the component (C) contain epoxy groups in their shell and have a volume-average particle size of 50 to 300 nm; and wherein the at least one liquid diamine curing agent further comprises a diaminosulfone comprising a mixture of 3,3'-diaminodiphenylsulfone and 4,4'-diaminodiphenylsulfone.

2. The method for producing a fiber-reinforced composite material according to claim 1, wherein the reinforcing fibers comprise carbon fibers.

3. The method for producing a fiber-reinforced composite material according to claim 1, which contains the component (A) in an amount of 15 to 60 parts by mass with respect to 100 parts by mass of a total epoxy resin.

4. The method for producing a fiber-reinforced composite material according to claim 1, further comprising a tri- or higher-functional aromatic epoxy resin as a component (D) in an amount of 30 to 70 parts by mass with respect to 100 parts by mass of the total epoxy resin.

5. The method for producing a fiber-reinforced composite material according to claim 1, which contains a mixture of two or more liquid aromatic diamine curing agents represented by the formulas (IV) to (VI) and 10 to 40 parts by mass of the mixture of 3,3'-diaminodiphenylsulfone and 4,4'-diaminodiphenylsulfone with respect to 100 parts by mass of a total amine curing agent.

6. The method for producing fiber-reinforced composite material according to claim 1, wherein a core of the component (C) is composed of a polymer obtained by polymerization of a monomer containing butadiene.

7. The method for producing fiber-reinforced composite material according to claim 1, which contains the component (C) in an amount of 1 to 12 parts by mass with respect to 100 parts by mass of the total epoxy resin.

8. The method for producing fiber-reinforced composite material according to claim 1, wherein a cured product obtained by curing the epoxy resin composition at 180° C. for 2 hours has a glass transition temperature different from that of the core of the component (C) by 210° C. or more and a fracture toughness (GIC) at −54° C. of 120 J/m2 or higher.

9. The method for producing fiber-reinforced composite material according to claim 1, wherein the component (B) is at least diethyltoluene-diamine.

10. The method for producing fiber-reinforced composite material according to claim 1, wherein an initial viscosity of the epoxy resin composition at 70° Celsius is 500 mPa·s or less.

11. The method for producing fiber-reinforced composite material according to claim 1, wherein the fiber substrate is unidirectional fabric.

12. The method for producing fiber-reinforced composite material according to claim 1, wherein the impregnating of the fiber substrate with the epoxy resin composition is performed by evacuating an inside of a mold using a vacuum pump.

13. A method for producing fiber-reinforced composite material, comprising:
placing a fiber substrate composed of reinforcing fibers on a substrate; attaching a binder to the fiber substrate; mixing at least (i) an epoxy resin base composition and (ii) at least one liquid diamine curing agent to form an epoxy resin composition impregnating the fiber substrate and binder with the epoxy resin composition; and thermally curing the epoxy resin composition;
wherein the epoxy resin composition comprises at least the following components (A), (B), and (C);
wherein:
(A) is an epoxy resin base composition comprising at least one bifunctional epoxy resin represented by any one of the following formulas (I), (II), and (III):

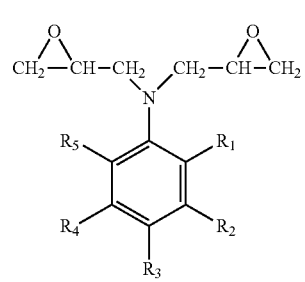

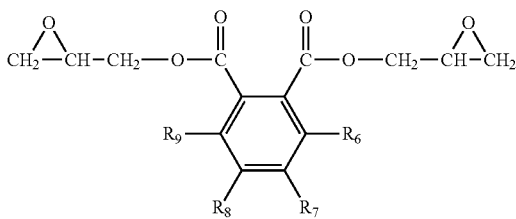

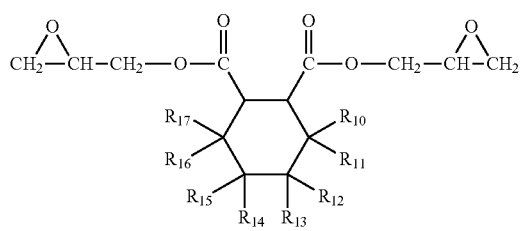

wherein $R_1$ to $R_{17}$ are each independently a substituent selected from among hydrogen, halogens, and $C_1$ to $C_4$ alkyl groups;

(B) is at least one liquid aromatic diamine curing agent comprising a mixture of 2,4-diethyl-6-methyl-1,3-phenylenediamine and 4,6-diethyl-2-methyl-1,3-phenylenediamine; and (C) comprises core-shell polymer particles, wherein the core-shell polymer particles as the component (C) contain epoxy groups in their shell and have a volume-average particle size of 50 to 300 nm.

14. The method for producing fiber-reinforced composite material according to claim 13, wherein the liquid diamine curing agent further comprises 10 to 40 parts by mass of diaminodiphenylsulfone with respect to 100 parts by mass of a total amine curing agent.

15. The method for producing fiber-reinforced composite material according to claim 14, wherein the diaminodiphenylsulfone is a mixture of 3,3'-diaminodiphenylsulfone and 4,4'-diaminodiphenylsulfone.

* * * * *